United States Patent [19]

Schläfer et al.

[11] Patent Number: 4,719,053
[45] Date of Patent: Jan. 12, 1988

[54] BETA-CHLOROETHYLSULFONYLMETH-YL-BENZOIC HALIDES AS INTERMEDIATES

[75] Inventors: Ludwig Schläfer, Kelkheim; Reinhard Hähnle, Königstein, both of Fed. Rep. of Germany

[73] Assignee: Hoechst Aktiengesellschaft, Frankfurt am Main, Fed. Rep. of Germany

[21] Appl. No.: 462,340

[22] Filed: Jan. 31, 1983

Related U.S. Application Data

[62] Division of Ser. No. 288,386, Jul. 30, 1981.

[30] Foreign Application Priority Data

Aug. 1, 1980 [DE] Fed. Rep. of Germany ....... 3029383

[51] Int. Cl.$^4$ .............................................. C07C 63/10
[52] U.S. Cl. .............................. 260/544 S; 534/629; 534/641
[58] Field of Search ........................................ 260/544 S

[56] References Cited

U.S. PATENT DOCUMENTS

| | | | |
|---|---|---|---|
| 3,019,266 | 1/1962 | Buc et al. | 260/205 X |
| 3,019,268 | 1/1962 | Buc et al. | 260/205 X |
| 3,094,516 | 6/1963 | Randall et al. | 260/163 |
| 3,098,096 | 7/1963 | Feeman | 260/199 X |
| 3,118,943 | 1/1964 | Buc et al. | 260/144 |
| 3,158,597 | 11/1964 | Glass et al. | 260/199 |
| 3,169,822 | 2/1965 | Randall et al. | 260/144 X |
| 3,170,912 | 2/1965 | Freyermouth et al. | 260/163 |
| 3,261,658 | 7/1966 | Feeman | 260/163 X |
| 3,271,435 | 9/1966 | Randall et al. | 260/144 X |
| 3,277,075 | 10/1966 | Mayhew | 260/201 |
| 4,139,527 | 2/1979 | Meininger et al. | 260/199 |

FOREIGN PATENT DOCUMENTS

| | | | |
|---|---|---|---|
| 1444611 | 5/1969 | Fed. Rep. of Germany | 260/205 |
| 1272802 | 5/1972 | United Kingdom | 260/197 |

OTHER PUBLICATIONS

Kuhn-Birkett, "Markblatter Gefahrliche Arbeitsstoffe, Jun. 1982, Sheet No. D24.
Registry of Toxic Effects of Chemical Substances, Ed. 1977, vol. II, p. 410.
Suspected Carcinogens, Jun. 1975, p. 160.
BrederecK et al., Chemical Abstracts, vol. 82, #113178a (1975).
Fieser et al., "Organic Chemistry", p. 655, (1956).
Royals, "Advanced Organic Chemistry", pp. 454-455, (1954).

*Primary Examiner*—Floyd D. Higel
*Attorney, Agent, or Firm*—Curtis, Morris & Safford

[57] ABSTRACT

New β-chloroethylsuflonylmethyl-benzoic acid halides which can serve as fibre-reactive anchors for thesynthesis of novel organic, water-soluble compounds, preferably dyestuffs, having fibre-reactive and fibre-finishing properties, such as preferably dyestuff properties, and containing, as a fibre-reactive group, one or two β-chloroethylsufonylmethylbenzoic acid amide groups. For the synthesis of these novel fibre-finishing compounds, said new β-chloroethylsulfonylmethyl-benzoic acid halide compounds are reacted with an organic, water-soluble compound having fibre-finishing properties and continuing one or two amino groups. Also precursors of the fibre-finishing, fibre-reactive compounds, containing said β-chloroethylsulfonylmethylbenzxoic acid amid grouping, can be employed for their synthesis. The novel fibre-finishing compounds can be applied onto suitable fibre materials, such as especially cellulose fibre material and natural or synthetic polyamide fibre materials, and fixed on these fibre materials in a manner similar to application and fixation methods usual in the technique for fibre-reactive compounds. The fibre-finished material, such as dyed material, shows very good wet fastnesses.

6 Claims, No Drawings

BETA-CHLOROETHYLSULFONYLMETHYL-BENZOIC HALIDES AS INTERMEDIATES

This is a division of application Ser. No. 288,386 filed July 30, 1981.

The invention is based on the industrial field of finishing fiber materials using fiber-reactive compounds, in particular dyestuffs; these new fiber-reactive compounds are based on a new fiber-reactive anchor, to which the present invention also relates.

Fiber-reactive compounds, predominantly dyestuffs, including those which have a β-chloroethylsulfonyl-alkyl radical as the fiber-reactive anchor, are described in the literature. These known compounds do not in all cases fulfil the requirements of present-day technology; thus, in many cases their degree of fixation to the fiber material is unsatisfactory or the cellulose fiber materials finished with these compounds have certain fastness deficiencies. In particular, the fiber-reactive dyestuffs known from British Patent Specification No. 917,104 have the deficiency that their manufacture on an industrial scale appears to be excluded since the chloromethylation necessary for their synthesis is associated with the formation of highly toxic dichlorodimethyl ether as a by-product.

The present invention provides new compounds, in particular dyestuffs, which have a new fiber-reactive group and which can be applied with a high tinctorial strength and constant color yield and shade by customary methods for using fiber-reactive compounds on such fiber materials, and can be fixed on such fiber materials with a sufficient degree of fastness to wet processing. The industrial synthesis of these new compounds can be carried out easily and without ecological problems.

The present invention relates to new water-soluble compounds of the general formula (1)

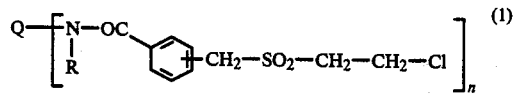

in which Q is the radical of a water-soluble organic compound which has fiber-finishing properties, such as, preferably, the radical of a water-soluble dyestuff molecule or, for example, the radical of a water-soluble compound which is capable of optically brightening or moth-proofing fiber material or imparting to the fiber material water-repellant properties, or a soft handle, or an increased ease of dyeing, or good crease-resistance, or good flameproof character, Q containing groups which render it water-soluble, preferably 1 to 8 groups which render it water-soluble, such as carboxylic acid groups and, in particular, sulfonic acid groups, R is a hydrogen atom or an alkyl group, in particular lower alkyl, and n represents the number 1 or 2, preferably 1.

The abovementioned new compounds of the general formula (1) are in the form of their free acid, or, preferably, in the form of their salts, in particular neutral salts, such as, for example, their alkali metal salts or alkaline earth metal salts, thus, for example, the sodium, potassium or calcium salts, and they are preferably used in the form of these salts for application to and for finishing fiber materials.

Here and in the following text, the term "lower" means that the alkyl, alkylene or alkenyl radical contained in the group preferably comprises 1 to 4 C atoms.

The present invention preferably relates to compounds of the general formula (1) in which Q is a water-soluble organic dyestuff radical which preferably contains 1 to 8 groups which render it water-soluble. The dyestuffs can belong to the most diverse classes of organic compounds; Q can thus represent the radical of an organic dyestuff of the anthraquinone, formazan, cyanine, phthalocyanine, benzoxanthene, benzothioxanthene, xanthene, triphenylmethane, azine, phenazine, oxazine, phenoxazine, thiazine, quinoline, indolephenazine, azomethine, styryl, nitro and naphthalimide series, it being possible for the dyestuff chromophores suitable in this context also to contain heavy metals bonded as complexes, such as, for example, copper, nickel, cobalt and chromium ions; however, the radical Q preferably represents the radical of a mono-, dis- or poly-azo dyestuff, such as a trisazo or tetrakisazo dyestuff, or of a heavy metal complex thereof, this dyestuff radical Q in each case preferably containing 1 to 8 groups which render it water-soluble.

According to the invention, the new compounds of the general formula (1) are prepared by a process which comprises reacting an organic compound of the general formula (2)

in which Q, R and n have the abovementioned meanings, with a compound of the general formula (3)

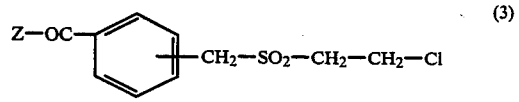

in which Z represents a halogen atom, preferably a chlorine atom, or reacting organic precursors for the synthesis of the molecular radical of the formula Q with one another in the customary manner suitable for this reaction, these precursors being chosen such that at least one of them contains one or more groups rendering it water-soluble and at least one group of the formula (4)

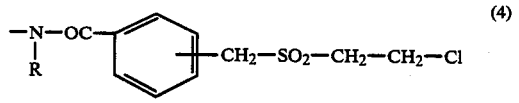

in which R has the abovementioned meaning, and these precursors again being chosen such that a compound of the formula (1) in which n represents the number 1 or 2 and the radical Q contains 1 to 8 groups which render it water-soluble is obtained.

Precursors which can be employed, according to the invention, for the preparation of the compounds of the general formula (1) are, for example, diazo components and coupling components appropriate for the preparation of azo dyestuffs, one of these components containing at least one group which renders it water-soluble and a fiber-reactive group of the formula (4).

The present invention also relates to the new compounds of the formula (3) with the abovementioned meaning, and to their use as fiber-reactive anchors in compounds with fiber-finishing properties, in particular for the preparation of fiber-reactive organic dyestuffs.

According to the invention, the new compounds of the formula (3) can be prepared by a process which comprises converting a compound of the general formula (5)

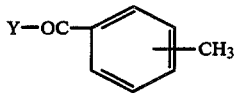  (5)

in which Y represents the hydroxy group, a lower alkoxy group or a halogen atom, preferably a chlorine atom, into a compound of the general formula (6)

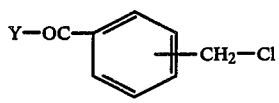  (6)

in which Y has the abovementioned meaning, at a temperature between 80° and 130° C., preferably between 100° and 110° C., if appropriate in an organic solvent which is usual and suitable for side-chain chlorination, such as an aromatic halogenohydrocarbon, for example chlorobenzene or dichlorobenzene, reacting this compound with 2-mercaptoethanol in aqueous solution, preferably at a temperature between 50° and 70° C. and at a pH value between 7 and 9, to give the thioether compound of the general formula (7a)

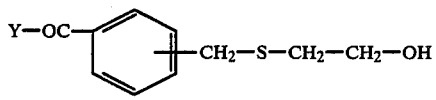  (7a)

in which Y denotes the hydroxy group or a lower alkoxy group, subsequently converting this thioether compound—but in the case where Y represents a lower alkoxy group, after prior alkaline hydrolysis at a pH value of 9 to 12 to give the compound in which Y is hydroxy—into the β-hydroxyethylsulfonylmethyl compound of the general formula (7b)

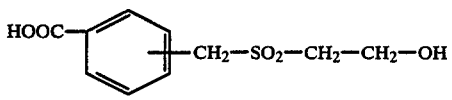  (7b)

with an oxidizing agent, for example 20–40% strength aqueous hydrogen superoxide, and subsequently reacting this compound, if appropriate after intermediate isolation, for example by precipitation with an aqueous mineral acid, such as hydrochloric acid, with a chlorinating agent which is usual and suitable for this purpose, such as, for example, thionyl chloride, in an organic solvent which is usual and suitable for this purpose, to give the β-chloroethylsulfonyl compound of the general formula (3).

The side-chain chlorination reaction to give the compound of the general formula (6) can be carried out by a procedure analogous to known procedures, such as are described, for example, in Houben-Weyl, Methoden der organischen Chemie (Methods of Organic Chemistry), 4th edition, Volume V/3, page 735. The reaction of the compound of the formula (6) with mercaptoethanol to give the thioether compound of the formula (7a) can also be carried out by a procedure analogous to known procedures, such as are described, for example, in Houben-Weyl, 4th edition, Volume IX, page 105. The oxidation of the sulfur in the thioether compound of the formula (7a) to give the sulfonyl group as in the compound of the formula (7b) can likewise be carried out by a procedure analogous to known procedures; hydrogen peroxide is suitable as such an oxidizing agent, and the oxidation can be carried out by a procedure analogous to those in Houben-Weyl, 4th edition, Volume IX, page 227. The conversion of the β-hydroxyethylsulfonyl group into the β-chloroethylsulfonyl group with simultaneous conversion of the carboxy group into the carboxylic acid chloride radical is carried out in the customary and known manner; such reactions are known, for example, from Houben-Weyl, 4th edition, Volume V/3, pages 862, 899 and 905. Thionyl chloride is the preferred chlorinating agent for this reaction.

In the compounds of the formulae (1) and (3) according to the invention, the β-chloroethylsulfonylmethyl group is in the 2-position or, preferably, in the 3- or 4-position relative to the carboxylic acid amide group or carboxylic acid halide group.

Compounds of the formula (3) according to the invention are thus the compounds of the formulae (3a), (3b) and (3c)

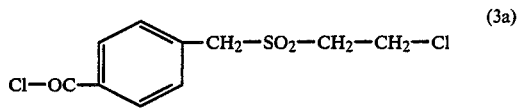  (3a)

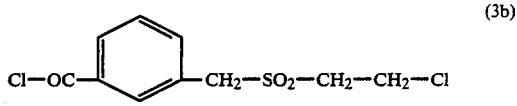  (3b)

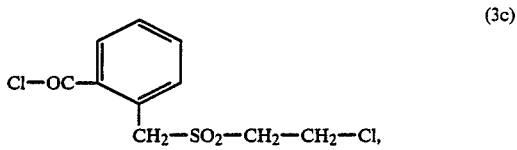  (3c)

and of these, preferably those of the formulae (3a) and (3b).

The precursors for the molecular radical of the formula Q which contain one or more fiber-reactive groups of the formula (4) can be prepared in a manner similar to that for the compounds of the general formula (1), by a process which comprises using starting compounds of the general formula (8)

  (8)

in which R and n have the abovementioned meanings and $Q_1$ represents the radical of the corresponding precursor with optionally one or more groups which render it water-soluble (thus, for example, if Q is the radical of a monoazo dyestuff, $Q_1$ represents the radical of a diazo component or coupling component), and reacting this amino compound of the formula (8) with a compound of the formula (3). If compounds of the formula (8) in which Q₁ contains a primary amino group, for example a diaminobenzene-sulfonic acid, which is suitable as a diazo component or as a coupling component, are used as the starting compounds, the reaction with the carboxylic acid halide of the formula (3) to give the monoaminoacylamino compound takes place in only one stage.

Precursors according to the invention, of the general formula (9)

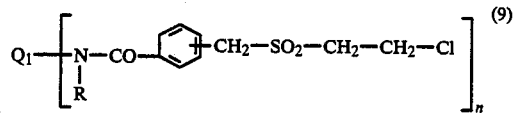

in which $Q_1$, R and n have the abovementioned meaning, which are particularly suitable as diazo components or coupling components for the preparation of azo dyestuffs are, in particular, those compounds in which $Q_1$ represents a benzene or naphthalene radical which is substituted by a primary amino group and is optionally substituted by 1, 2 or 3 sulfonic acid groups and/or 1, 2 or 3 other substituents belonging to the group comprising lower alkyl, lower alkoxy, carboxy, hydroxy, acetylamino, benzoylamino, phenylamino, phenylamino substituted by substituents from the group comprising lower alkyl, lower alkoxy, sulfo, carboxy, acetylamino, benzoylamino and halogen, such as chlorine, carboxylic acid amide, carboxylic acid amide which is monosubstituted or disubstituted by lower alkyl and/or phenyl (it being possible for the phenyl radical to be further substituted by substituents from the group comprising lower alkyl, lower alkoxy, sulfo, carboxy, chlorine and amino), sulfonic acid amide, sulfonic acid amide which is monosubstituted or disubstituted by lower alkyl and/or phenyl (it being possible for the phenyl radical to be further substituted by substituents from the group comprising lower alkyl, lower alkoxy, sulfo, carboxy, chlorine and amino), cyano, nitro, halogen, such as chlorine, fluorine and bromine, and trifluoromethyl.

Compounds of the general formula (9) which are preferred as diazo components are those in which $Q_1$ contains a primary amino group and represents a benzene nucleus which can be substituted by 1 or 2 substituents belonging to the group comprising lower alkyl, lower alkoxy, chlorine, bromine, sulfo, carboxy, acetylamino, benzoylamino, benzoylamino which is substituted by substituents from the group comprising methoxy, methyl, chlorine and sulfo, phenylamino, phenylamino which is substituted by substituents from the group comprising methoxy, methyl and sulfo, hydroxy, nitro, carboxylic acid amide, sulfonic acid amide, carboxylic acid monoalkylamide, carboxylic acid dialkylamide, sulfonic acid monoalkylamide, sulfonic acid dialkylamide, carboxylic acid N-phenylamide, sulfonic acid N-phenylamide, carboxylic acid N-alkyl-N-phenyl-amide, sulfonic acid N-alkyl-N-phenyl-amide (the alkyl radicals in the amides in each case being lower alkyl radicals and it being possible for the phenyl radicals to be further substituted by substituents from the group comprising sulfo, lower alkyl, lower alkoxy, chlorine and amino) and carboxylic acid lower dialkylamide, in which one of the alkyl radicals is substituted by a phenyl radical, which can in turn be substituted by substituents from the group comprising sulfo, lower alkyl, lower alkoxy, chlorine and amino, and R has the abovementioned meaning and n represents the number 1.

Further compounds of the general formula (9) which are suitable as diazo components are those in which $Q_1$ represents the naphthalene nucleus, which is substituted by an amino group and can be substituted by 1 or 2 sulfonic acid groups and by 1 or 2 other substituents belonging to the group comprising hydroxy, lower alkyl, lower alkoxy, nitro, chlorine and carboxy, and R has the abovementioned meaning and n represents the number 1 or 2, preferably 1.

Compounds of the general formula (9) which are suitable as coupling components for the preparation of azo dyestuffs are, for example, those in which $Q_1$ represents the radical of naphthol, which can be substituted by 1, 2 or 3 sulfo groups and by a further amino group, phenylamino group or a lower alkylamino group, and also those in which $Q_1$ represents the benzene nucleus, which is substituted by a hydroxy group and/or an amino group or a phenylamino or lower alkylamino group and can be substituted by a lower alkyl or lower alkoxy group or a chlorine atom. Further compounds of the general formula (9) which are suitable as coupling components for the preparation of azo dyestuffs are, for example, those in which $Q_1$ represents the naphthalene nucleus, which is substituted by an amino group and can be substituted by 1, 2 or 3 sulfo groups, and also the radical of pyrazol-5-one, pyrazol-3-one, 5-amino-pyrazole or 3-amino-pyrazole, these pyrazole radicals being substituted, that is to say the pyrazol-5-one or 5-aminopyrazole radical in each case in the 3-position, by lower alkyl, phenyl, chlorophenyl, methylphenyl, carboxy or lower carbalkoxy, and in each case in the 1-position by a phenyl or naphthyl radical, the fiber-reactive group(s) being bonded to these phenyl and naphthyl radicals and it being possible for these phenyl and naphthyl radicals furthermore to be substituted by 1, 2 or 3 substituents from the group comprising lower alkyl, lower alkoxy, chlorine, bromine, trifluoromethyl, sulfo, carboxy, acetylamino, benzoylamino, amino and cyano. Moreover, $Q_1$ is, for example, the radical of acetoacetyl-anilide or -naphthylamide, in which the fiber-reactive group(s) of the formula (4) is/are bonded to the aromatic nuclei and these aromatic nuclei can be further substituted by 1, 2 or 3 substituents belonging to the group comprising lower alkyl, lower alkoxy, chlorine, bromine, sulfo, carboxy, acetylamino, benzoylamino, nitro and cyano, and furthermore all other organic compounds which undergo coupling with aromatic diazonium compounds to give azo compounds, such as, for example, malonic acid and its derivatives, such as alkyl malonates and malodinitrile, and barbituric acid and its derivatives.

Compounds of the general formula (9) which can preferably be employed as coupling component are, for example, compounds of the general formulae (9a), (9b), (9c), (9d), (9e), (9f), (9g), (9h) or (9j)

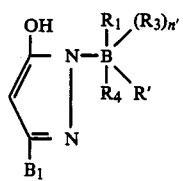

-continued

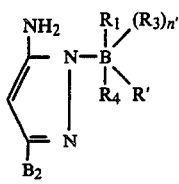

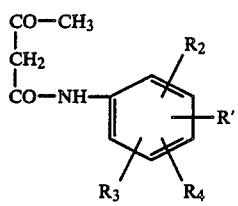

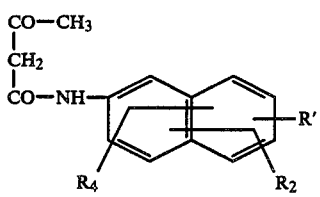

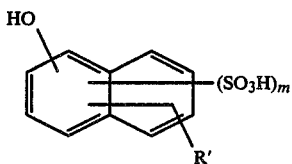

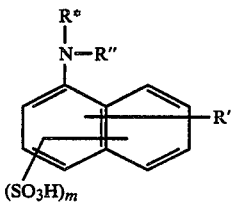

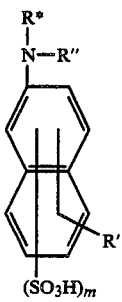

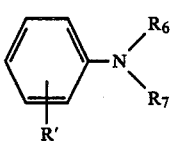

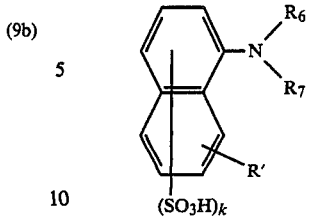

In these formulae: R' is the fiber-reactive acylamide radical of the general formula (4); $R_1$ is a hydrogen atom, a lower alkyl group, such as, in particular, a methyl or ethyl group, a lower alkoxy group, such as, in particular, a methoxy or ethoxy group, a chlorine or bromine atom, a lower alkanoylamino group, such as an acetylamino group, or a sulfonic acid group; $R_2$ is a hydrogen atom, a lower alkyl group, such as, in particular, a methyl or ethyl group, a lower alkoxy group, such as, in particular, a methoxy or ethoxy group, a chlorine or bromine atom or a sulfonic acid group; $R_3$ is a hydrogen atom, a lower alkyl group, such as, in particular, the methyl or ethyl group, a lower alkoxy group, such as, in particular, the methoxy or ethoxy group, or a chlorine or bromine atom; and $R_4$ is a hydrogen atom, a lower alkyl group, such as, in particular, the methyl or ethyl group, a lower alkoxy group, such as, in particular, the methoxy or ethoxy group, or the sulfonic acid group, it being possible for $R_1$, $R_2$, $R_3$ and $R_4$ to be identical or different; and n' is the number 1 or 2; B is a benzene or naphthalene nucleus; $B_1$ is a lower alkyl group, preferably the methyl group, a carboxy group, a carbomethoxy or carbethoxy group or the phenyl radical; and $B_2$ is a lower alkyl group, preferably the methyl group, a carbomethoxy or carbethoxy group, a carbonamide group or a phenyl radical, which can be substituted by 1 or 2 substituents from the group comprising lower alkyl, lower alkoxy, chlorine, bromine and sulfo, it being possible for $R_1$, $R_3$, $R_4$ and $B_1$ or $B_2$ to be identical or different; R* is a hydrogen atom or a lower alkyl radical; and R" is a hydrogen atom, a lower alkyl radical or a phenyl radical, which can be substituted by 1 or 2 substituents from the group comprising lower alkyl, lower alkoxy, chlorine, bromine and sulfo, it being possible for R* and R" to be identical or different; k is the number zero or 1; m represents the number zero, 1 or 2; $R_6$ is a hydrogen atom or a lower alkyl group, which can be substituted by a hydroxy, cyano, carboxy, sulfo, sulfato, carbomethoxy, carbethoxy or acetoxy group; and $R_7$ is a hydrogen atom or a lower alkyl group, which can be substituted by a hydroxy, cyano, carboxy, sulfo, sulfato, carbomethoxy, carbethoxy or acetoxy group or a phenyl radical, or is a phenyl radical, which can be substituted by lower alkyl, lower alkoxy, chlorine and-/or sulfo, it being possible for $R_1$, $R_6$ and $R_7$ to be identical or different.

Preferred compounds of the general formula (9) which can be used as diazo components for the preparation of fiber-reactive azo dyestuffs are, for example, the compounds of the formulae (9k), (9m), (9n) and (9p)

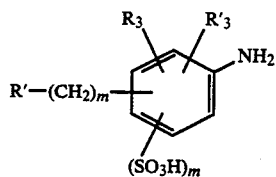 (9k)

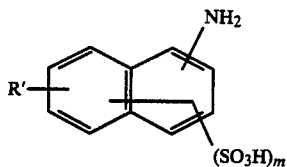 (9m)

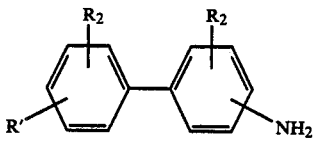 (9n)

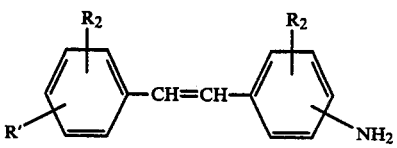 (9p)

In these formulae, the radicals R', $R_2$, $R_3$ and m have the abovementioned meanings, it being possible for the indices m to be identical or different, and $R_3'$ is a hydrogen atom, a lower alkyl group, such as, in particular, the methyl or ethyl group, a lower alkoxy group, such as, in particular, the methoxy or ethoxy group, a chlorine or bromine atom or a hydroxy group, it being possible for $R_3$ and $R_3'$ to be identical or different.

Examples of compounds of the general formula (9) are: 1,3-diaminobenzene, 1,3-diaminobenzene-4-sulfonic acid, 1,4-diaminobenzene, 1,4-diaminobenzene-2-sulfonic acid, 1,4-diaminobenzene-2,5-disulfonic acid, 1,4-diamino-2-methylbenzene, 1,4-diamino-2-methoxybenzene, 1,3-diamino-4-methylbenzene, 1,4-diaminobenzene-2,6-disulfonic acid, 1-amino-8-naphthol-3,6-disulfonic acid, 1-amino-8-naphthol-4,6-disulfonic acid, 2-amino-8-naphthol-6-sulfonic acid, 2-amino-8-naphthol-4,6-disulfonic acid, 2-amino-5-naphthol-7-sulfonic acid, 1-amino-5-naphthol-7-sulfonic acid, 1-amino-8-naphthol-4-sulfonic acid or -5-sulfonic acid or -6-sulfonic acid, 2-aminophenol-4- or -5-sulfonic acid, 3-aminophenol-6-sulfonic acid, 1,6-diamino-2-naphthol-4-sulfonic acid, 1,6-diamino-naphthalene-4-sulfonic acid, 2,6-diamino-4,8-disulfonaphthalene, 2,6-diamino-1-naphthol-4,8-disulfonic acid, 1,3-diaminobenzene-5-sulfonic acid, 1,3-diamino-5-methylbenzene, 2,6-diaminophenol-4-sulfonic acid, 1-(3'- or -4'-aminophenyl)-3-methyl-5-pyrazolone, 1-(3'- or -4'-aminophenyl)-5-pyrazolone-3-carboxylic acid or lower alkyl esters thereof, such as the methyl or ethyl ester, 1-(4'-amino-2'-sulfophenyl)-5-pyrazolone-3-carboxylic acid or the methyl or ethyl ester thereof, 1-(5'-amino-2'-sulfophenyl)-5-pyrazolone-3-carboxylic acid or the methyl or ethyl ester thereof, 1-(2'-methyl-5'-amino-3'-sulfophenyl)-5-pyrazolone-3-carboxylic acid or the methyl or ethyl ester thereof, 4-acetoacetylaminoaniline-2-sulfonic acid, 4-(ω-N-methylamino-methyl)-aniline-2-sulfonic acid or 3-(ω-N-methylamino-methyl)-aniline-6-sulfonic acid, in all of which, corresponding to formula (9), in each case the one primary or secondary amino group or one of these two amino groups is substituted by the fiber-reactive acyl radical of the compound of the general formula (3).

For the preparation of the dyestuffs (1) according to the invention, these diazo components and coupling components of the formula (9) can be reacted in the customary manner with aromatic amines, for example those which are universally known, in the literature, for the preparation of azo dyestuffs, and coupling components, for example those which are generally known, in the literature, for the preparation of azo dyestuffs. Monoazo dyestuffs, disazo dyestuffs or polyazo dyestuffs, for example trisazo dyestuffs or tetrakisazo dyestuffs, can be obtained by the customary procedures. The azo dyestuffs can subsequently be converted into the corresponding heavy metal complex dyestuffs, such as the copper, cobalt or chromium complex dyestuffs, by customary methods of metallization (see Houben-Weyl, "Methoden der organischen Chemie" ("Methods of Organic Chemistry"), 4th edition (1965), Volume 10/3, pages 452 et seq.; Angewandte Chemie 70, 232–238 (1958); and Angewandte Chemie 64, 397 (1952)).

Particularly preferred compounds of the formula (1) according to the invention are monoazo compounds and disazo compounds which are built up from the diazo and coupling components of the general formulae (9) or (9) and (10) which are mentioned above and/or below.

Aromatic amines which do not contain a fiber-reactive radical of the formula (4) and can be used as the diazo components are, for example, the amines of the formulae (10a), (10b), (10c) and (10d) and the diamines of the formula (10e):

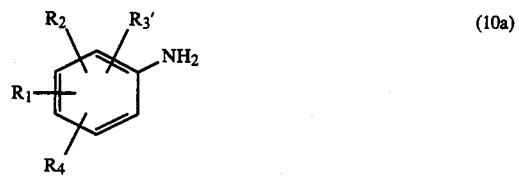 (10a)

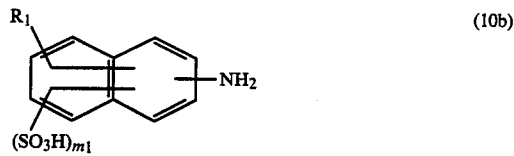 (10b)

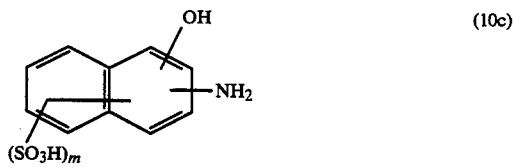 (10c)

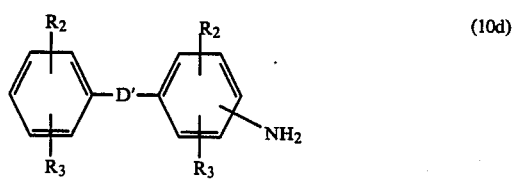 (10d)

-continued

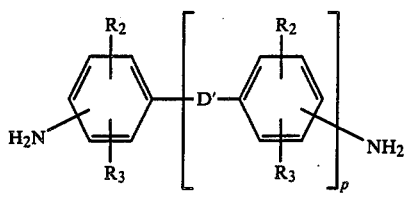 (10e)

in which $R_1$, $R_2$, $R_3$, $R_4$ and m have the abovementioned meanings and D' is a direct bond or represents the group —NHCO—, —CO—NH—, —CO—, —SO$_2$—, —CH=CH—, —N=N—, —O— or —CH$_2$—, $m_1$ denotes the number zero, 1, 2 or 3 and p denotes the number zero or 1.

Coupling components which do not contain a fiber-reactive radical of the formula (4) and can be used for the preparation of the dyestuffs according to the invention are, for example, the compounds of the formulae (10f), (10g), (10h), (10i), (10j), (10k$_1$), (10k$_2$), (10m), (10n), (10p), (10q), (10r$_1$), (10r$_2$), (10r$_3$) and (10s):

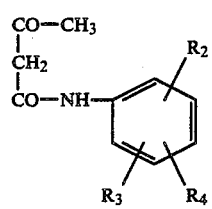 (10f)

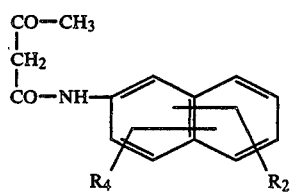 (10g)

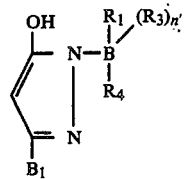 (10h)

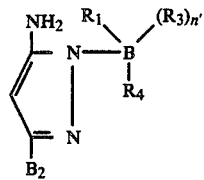 (10i)

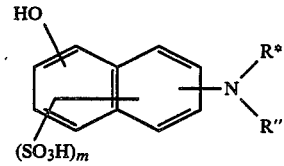 (10j)

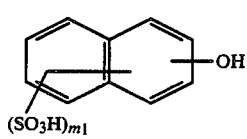 (10k$_1$)

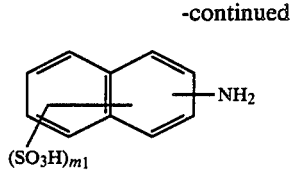 (10k$_2$)

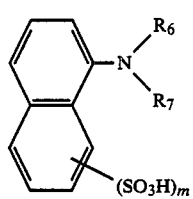 (10m)

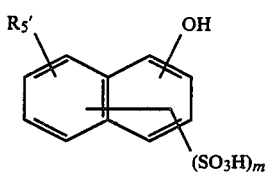 (10n)

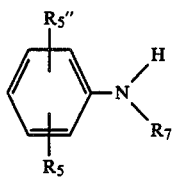 (10p)

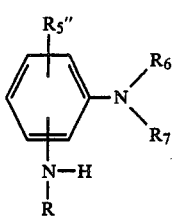 (10q)

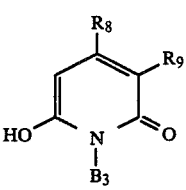 (10r$_1$)

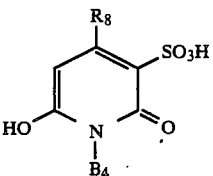 (10r$_2$)

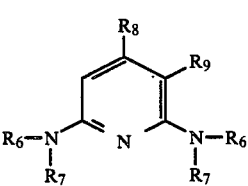 (10r$_3$)

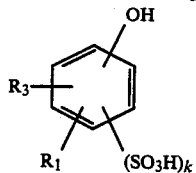
(10s)

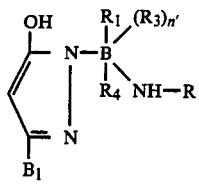
(10u)

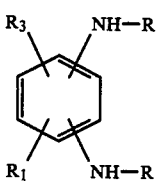
(10v)

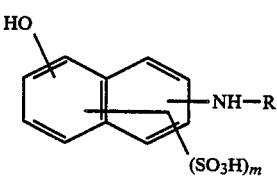
(10w)

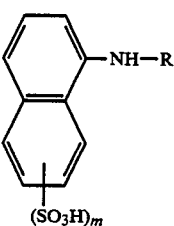
(10x)

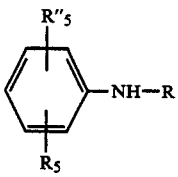
(10y)

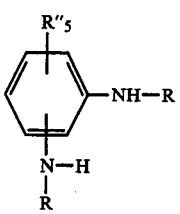
(10z)

in which R, $R_1$, $R_2$, $R_3$, $R_4$, $R_6$, $R_7$, R", R*, k, m, $m_1$, n', B, $B_1$ and $B_2$ have the abovementioned meanings, $R_5$ is a hydrogen atom, a lower alkyl group, such as a methyl or ethyl group, a lower alkoxy group, such as a methoxy or ethoxy group, or a chlorine or bromine atom, $R_5''$ represents a hydrogen atom, a lower alkyl group, such as a methyl or ethyl group, a lower alkoxy group, such as a methoxy or ethoxy group, a chlorine or bromine atom, a lower alkanoylamino group, such as an acetylamino group, or an amino, ureido, lower alkylsulfonylamino, lower alkylamino or lower dialkylamino group, $R_8$ is a hydrogen atom or a lower alkyl group, such as a methyl or ethyl group, or a lower alkyl group which is substituted by lower alkoxy or cyano, $R_9$ denotes a hydrogen atom, a lower alkyl group, such as a methyl group, a lower sulfoalkyl group, such as a sulfomethylene group, or the cyano or carbonamide group, $B_3$ denotes a hydrogen atom or a lower alkyl group, such as a methyl or ethyl group, which can be substituted by phenyl or sulfophenyl, $B_4$ is a hydrogen atom, a lower alkyl group, a lower alkyl group which is substituted by lower alkoxy, such as methoxy, or by acetylamino, benzoylamino or cyano, or is a lower alkenyl group, a cyclohexyl group, the phenyl group or a phenyl radical which is substituted by substituents from the group comprising carboxy, sulfo, benzoylamino, acetylamino and chlorine, or an amino group, which is substituted by phenyl, lower alkyl, acetyl, benzoyl, hydroxy or methoxy, and $R_5'$ represents the phenylureido group, a lower alkanoylamino or lower alkenoylamino group, such as an acetylamino, propionylamino or acryloylamino group, or a benzoylamino group, which can be substituted by chlorine, methyl, methoxy, nitro, sulfo and/or carboxy.

Compounds which do not contain a fiber-reactive radical of the general formula (4) and can be used either as diazo components or as coupling components for the preparation of dyestuffs of the general formula (1) according to the invention, thus, for example, for the preparation of disazo and polyazo dyestuffs, are, for example, compounds of the general formulae ($10t_1$), ($10t_2$), (10u), (10v), (10w), (10x), (10y) and (10z)

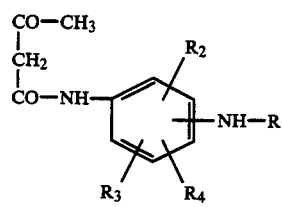
($10t_1$)

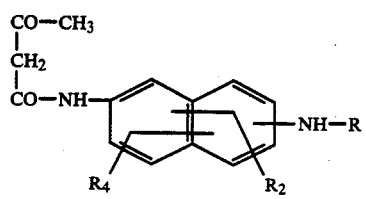
($10t_2$)

in which B, $B_1$, $B_2$, R, $R_1$, $R_2$, $R_3$, $R_4$, $R_5$, $R_5''$, m and n' have the abovementioned meaning, and one R necessarily represents a hydrogen atom if the compound is used as a diazo component. Furthermore, their use as coupling components enables the free amino group of the coupling component in the azo compound obtained to be reacted with the fiber-reactive acid halide of the general formula (3).

Aromatic amines which do not contain a fiber-reactive group of the general formula (4) and can be used as diazo components for the preparation of the dyestuffs according to the invention and correspond, for example, to the general formulae (10a), (10b), (10c) and (10d) are, for example: aniline, 2-methoxyaniline, 2-ethoxyaniline, 2-methylaniline, 4-nitro-2-aminoanisole, 4-chloro-2-aminoanisole, 4-methylaniline, 4-methoxyaniline, 2-nitro-4-aminoanisole, 2-methoxy-5-methylaniline, 4-nitroaniline, 2-chloro-4-nitroaniline, 2,6- dichloro-4-nitroaniline, 2-nitro-4-methylaniline, 2,5-dimethoxyaniline, 2,5-dimethylaniline, 2,4-dimethylaniline, 4-butylaniline, 2-cyano-4-nitroaniline, 2,5-diethoxyaniline, 4-cyanoaniline, 2-chloroaniline, 3-chloroaniline, 4-chloroaniline, 2,5-dichloroaniline, 4-chloro-2-nitroaniline, 4-chloro-2-methylaniline, 3-chloro-2-methylaniline, 4-chloro-2-aminotoluene, 4-(p'-tolylsulfonyl)-aniline, 2-ethoxy-1-naphthylamine, 1-naphthylamine, 2-naphthylamine, 4-benzoylamino-2,5-diethoxyaniline, 3-amino-4-methyl-benzonitrile, 4-methylsulfonylaniline, 2-trifluoromethylaniline, 1-trifluoromethyl-3-chloroaniline, 2-aminobenzothiazole, 2-(2'-aminophenyl)-benzotriazole, 1-aminoanthraquinone-3-sulfonic acid, 2,4-dichloroaniline-5-carboxylic acid, 2-aminobenzoic acid, 4-aminobenzoic acid, 3-chloroaniline-6-carboxylic acid, aniline-2- or -3- or -4-sulfonic acid, 2,5-disulfoaniline, 2,4-disulfoaniline, 2-aminotoluene-4-sulfonic acid, 2-aminoanisole-4-sulfonic acid, 2-aminoanisole-5-sulfonic acid, 2-ethoxyaniline-5-sulfonic acid, 2-ethoxyaniline-4-sulfonic acid, 4-sulfo-2-aminobenzoic acid, 2,5-dimethoxyaniline-4-sulfonic acid, 2,4-dimethoxyaniline-5-sulfonic acid, 2-methoxy-5-methylaniline-4-sulfonic acid, 4-aminoanisole-3-sulfonic acid, 4-aminotoluene-3-sulfonic acid, 2-aminotoluene-5-sulfonic acid, 2-chloroaniline-4-sulfonic acid, 2-chloroaniline-5-sulfonic acid, 2-bromoaniline-4-sulfonic acid, 2,6-dichloroaniline-4-sulfonic acid, 2,6-dimethylaniline-3-sulfonic acid or -4-sulfonic acid, 2,4,6-trimethylaniline-3-sulfonic acid, 4-acetylamino-2-sulfoaniline, 1-aminonaphthalene-4-sulfonic acid, 2-naphthylamine-5-sulfonic acid or -6- or -8-sulfonic acid, 2-aminonaphthalene-3,6,8-trisulfonic acid, 2-aminonaphthalene-6,8-disulfonic acid, 2-aminonaphthalene-1,6-disulfonic acid, 2-aminophenol-4-sulfonic acid, 2-aminophenol-5-sulfonic acid, 3-aminophenol-6-sulfonic acid, 4- or 5-nitro-2-aminophenol, 4-nitro-6-sulfo-2-aminophenol, 1-hydroxy-2-aminonaphthalene-6,8- or -4,6-disulfonic acid, 2-aminonaphthalene-1-sulfonic acid, 2-aminonaphthalene-1,6- or -4,8-disulfonic acid, 6-nitro-2-hydroxy-4-sulfo-aminonaphthalene, 6-nitro-2-aminonaphthalene-4,8-disulfonic acid, 4-aminodiphenylamine, 4-amino-4'-methoxydiphenylamine, 4-amino-4'-methoxydiphenylamine-3-sulfonic acid, 4-(2'-methylphenylazo)-2-methylaniline, 4-aminoazobenzene, 4'-nitrophenylazo-1-aminonaphthalene, 4'-amino-3'-methyl-3-nitrobenzophenone, 4-amino-2-methylbenzophenone, 3-amino-2,4-dimethylbenzophenone, 2-amino-4'-methoxybenzophenone, 4-aminobenzophenone, 4-(4'-aminophenylazo)-benzenesulfonic acid, 4-(4'-amino-3'-methoxyphenylazo)-benzenesulfonic acid and 2-ethoxy-1-naphthylamine-6-sulfonic acid.

Aromatic diamines which do not contain a fiber-reactive group of the general formula (4) and can be used as tetrazo components for the preparation of the dyestuffs according to the invention, and which correspond, for example, to the general formula (10e) are, for example: 1,3-diaminobenzene, 1,3-diaminobenzene-4-sulfonic acid, 1,4-diaminobenzene, 1,4-diaminobenzene-2-sulfonic acid, 1,4-diamino-2-methylbenzene, 1,4-diamino-2-methoxybenzene, 1,3-diamino-4-methylbenzene, 1,3-diaminobenzene-5-sulfonic acid, 1,3-diamino-5-methylbenzene, 1,6-diaminonaphthalene-4-sulfonic acid, 2,6-diamino-4,8-disulfonaphthalene, 3,3'-diaminodiphenyl sulfone, 4,4'-diaminodiphenyl sulfone, 3,3'-diaminodiphenyl sulfone-disulfonic acid, 4,4'-diaminostilbene-2,2'-disulfonic acid, 2,7'-diaminodiphenyl sulfone, 2,7'-diaminodiphenyl sulfone-4,5-disulfonic acid, 4,4'-diaminobenzophenone, 4,4'-diamino-3,3'-dinitrobenzophenone, 3,3'-diamino-4,4'-dichlorobenzophenone, 4,4'- or 3,3'-diaminodiphenyl, 4,4'-diamino-3,3'-dichlorodiphenyl, 4,4'-diamino-3,3'-dimethoxy- or -3,3'-dimethyl- or -2,2'-dimethyl- or -2,2'-dichloro- or -3,3'-diethoxy-diphenyl, 4,4'-diamino-3,3'-dimethyl-6,6'-dinitrodiphenyl, 4,4'-diamino-2,2'- or 3,3'-disulfodiphenyl, 4,4'-diamino-3,3'-dimethyl- or -3,3'-dimethoxy- or -2,2'-dimethoxy-6,6'-disulfodiphenyl, 4,4'-diamino-2,2',5,5'-tetrachlorodiphenyl, 4,4'-diamino-3,3'-dinitrodiphenyl, 4,4'-diamino-2,2'-dichloro-5,5'-dimethoxydiphenyl, 4,4'-diamino-2,2'- or -3,3'-dicarboxylic acid, 4,4'-diamino-3,3'-dimethyldiphenyl-5,5'-disulfonic acid 4,4'-diamino-2-nitrodiphenyl, 4,4'-diamino-3-ethoxy- or -3-sulfodiphenyl, 4,4'-diamino-3,3'-dimethyl-5-sulfodiphenyl, 4,4'-diamino-diphenylmethane, 4,4'-diamino-3,3'-dimethyldiphenylmethane, 4,4'-diamino-2,2',3,3'-tetramethyldiphenylmethane, 4,4'-diaminodiphenylethane, 4,4'-diaminostilbene, 4,4'-diaminodiphenylmethane-3,3'-dicarboxylic acid and 1,2-di-(4'-aminophenoxy)-ethane.

Aromatic monoamines and diamines which do not contain a fiber-reactive group of the general formula (4) and can be used both as diazo components and as coupling components in the preparation of dyestuffs according to the invention, thus, for example, of disazo and polyazo dyestuffs, and which correspond, for example, to the general formulae $(10t_1)$, $(10t_2)$, $(10u)$, $(10v)$, $(10w)$, $(10x)$, $(10y)$ and $(10z)$ are, for example: 1,3-diaminobenzene, 1,4-diaminobenzene, 1,4-diamino-2-methylbenzene, 1,4-diamino-2-methoxybenzene, 1,3-diamino-4-methyl- or -methoxy-benzene, 1-aminonaphthalene, 1-aminonaphthalene-6- or -7-sulfonic acid, 3-acetylaminoaniline, 3-methylaniline, 3-chloroaniline, 2-amino-8-naphthol-6-sulfonic acid, 2-amino-8-naphthol-4,6-disulfonic acid, 2-amino-5-naphthol-7-sulfonic acid, 3-amino-5-naphthol-7-sulfonic acid, 1-amino-5-naphthol-7-sulfonic acid, 1-N-acetoacetylamino-4-aminobenzene, 1-N-acetoacetylamino-4-N-methylaminobenzene, 1-N-acetoacetylamino-3-methyl-4-aminobenzene, 1-N-acetoacetylamino-3-methoxy-4-aminobenzene, 1-(3'-aminophenyl)-3-methyl-5-pyrazolone, 1-(4'-aminophenyl)-3-methyl-5-pyrazolone, 1-(3'- or -4'-aminophenyl)-3-carbethoxy-5-pyrazolone, 1-(3'-sulfo-4'-aminophenyl)-3-carbethoxy-5-pyrazolone, 1-(3'-amino-4'-sulfophenyl)-3-carbethoxy-5-pyrazolone, 1-(2',4',6'-trimethyl-3'-amino-5'-sulfophenyl)-3-carbethoxy-5-pyrazolone, 1-(4'-aminophenyl)-3-methyl-5-pyrazolone and 1-(3'-amino-6'-methylphenyl)-3-carboxy-5-pyrazolone.

Coupling components which do not contain a fiber-reactive group of the general formula (4) and can be used for the preparation of the dyestuffs according to the invention, and which, for example, correspond to the general formulae (10f) to (10k) are, for example: 1,3-diaminobenzene, 1,4-diaminobenzene, 1,4-diamino-2-methylbenzene, 1,4-diamino-2-methoxybenzene, 1,3diamino-4-methyl- or -methoxy-benzene, N,N-dimethylaniline, N,N-diethylaniline, N-methyl-N-(β-acetoxyethyl)-aniline, N,N-di-(β-cyanoethyl)-aniline, phenol, cresol, resorcinol, 2-ethoxyphenol, 4-methylphenol, 3sulfophenol, 1naphthol, 2-naphthol, 4-sulfonaphtnol, 5-sulfonaphthol, 3,6-disulfo-8-naphthol, 4,6-disulfo-8-naphthol, 1aminonaphthalene, 2-aminonaphthalene, 2-methylaminonaphthalene, 2-aminonaphthalene-6- or -7-sulfonic acid, 2-aminonaphthalene-3,6,8-trisulfonic acid, 2-amino-8-naphthol-6-sulfonic acid, 2-amino-8-naphthol-4,6-disulfonic acid, 1-amino-8-naphthol-3,6- or -4,6-disulfonic acid, 1-amino-8-naphthol-2,4-disulfonic acid, 1-acetylamino-8-naphthol-3,6- or -4,6-disulfonic acid, 1-benzoylamino-8-naphthol-3,6- or -4,6-disulfonic acid, 2-naphthol-5,7-disulfonic acid, 1-naphthol-3,6,8-trisulfonic acid, 2-acetylamino-5-naphthol-7-sulfonic acid, 2-benzoylamino-8-naphthol-6-sulfonic acid, 2-(p'-tosylamino)-5-naphthol-7-sulfonic acid, 2-acetylamino-8-naphthol-3,6-disulfonic acid, 2-acetylamino-5-naphthol-1,7-disulfonic acid, 2-benzoylamino-8-naphthol-6-sulfonic acid, 2-phenylsulfonylamino-5-naphthol-7-sulfonic acid, 2-(N-methyl-N-acetyl)-amino-8-naphthol-6-sulfonic acid, N,N-dimethyl-2-methoxy-5-methylaniline, N-methyl-N-(β-cyanoethyl)-aniline, N,N-dimethyl-2,5-dimethoxyaniline, N,N-bis-(β-hydroxyethyl)-2-methoxy-5-chloroaniline, N-(β-cyanoethyl)-2,5-dimethoxyaniline, N-(β-cyanoethyl)-2-chloroaniline, acetoacetylnaphthylamide, acetoacetyl-2-naphthylamide-5-sulfonic acid, N-acetoacetylaniline-3- or -4-sulfonic acid, N-acetoacetyl-2-methoxy-5-sulfoaniline, N-acetoacetyl-4-methoxy-3-sulfoaniline, N-acetoacetyl-2-methoxy-5-methyl-4-sulfoaniline, N-acetoacetyl-2,5-dimethoxy-4-sulfoaniline, 1-(4'-sulfophenyl)-3-methyl-5-pyrazolone, 1-(3'-sulfophenyl)-3-carboxy-5-pyrazolone, 1-(2'-methoxy-4'-sulfophenyl)-3-carboxy-5-pyrazolone, 1-(3'-sulfophenyl)-3-methyl-5-aminopyrazole, 1-(4'-sulfophenyl)-3-methyl-5-aminopyrazole, 1-(2'-methoxy-5'-sulfophenyl)-3-methyl-5-aminopyrazole, 1-(2'-methoxy-5'-methyl-4'-sulfophenyl)-3-methyl-5-aminopyrazole, acetoacetylaminobenzene, acetoacetylamino-2-methylbenzene, acetoacetylamino-2-methoxybenzene, (N-acetoacetyl-N-methyl)-aniline, (N-acetoacetyl-N-ethyl)-aniline, 1-N-acetoacetylamino-4-aminobenzene, 1-N-acetoacetylamino-4-N-methylaminobenzene, 1-N-acetoacetylamino-3-methyl-4-aminobenzene, 1-N-acetoacetylamino-3-methoxy-4-aminobenzene, 1-(3'-aminophenyl)-3-methyl-5-pyrazolone, 1-(4'-aminophenyl)-3-methyl-5pyrazolone, 1-(3'- or -4'-aminophenyl)-3-carbethoxy-5-pyrazolone, 1-(3'-sulfo-4'-aminophenyl)-3-carbethoxy-5-pyrazolone, 1-(3'-amino-4'-sulfophenyl)-3-carbethoxy-5-pyrazolone, 1-(2',4',6'-trimethyl-3'-amino-5'-sulfophenyl)-3-carbethoxy-5-pyrazolone, 1-(4'-aminophenyl)-3-methyl-5-pyrazolone, 1-(3'-N-methylaminophenyl)-3-carbomethoxy-5-pyrazolone, 1-(4'-N-methylamino-phenyl)-3-methyl-5-aminopyrazole, 1-(3'-amino-6'-methylphenyl)-3-carboxy-5-pyrazolone, 1-amino-3-N-methylaminobenzene, 1-amino-3-N-ethylaminobenzene, 2-N-methylamino-8-naphthol-6-sulfonic acid, 3-methyl-5-pyrazolone, 3-carboxy- or 3-carbamoyl-5-pyrazolone, 1-phenyl-3-methyl- or -3-carboxy-5-pyrazolone, 1-(4'-nitrophenyl)-3-methyl-5-pyrazolone, 1-(3'-acetylaminophenyl)-3-carboxy-5-pyrazolone, 1-(3'-carboxyphenyl)-3-methyl-5-pyrazolone, 2-methylindole, 2,3-hydroxynaphthoic acid, 8-hydroxyquinoline, 2-hydroxyquinoline, 2,5-bis-(N,N-diethylamino)-pyridine, 2-hydroxy-4-methyl-5-cyanopyridone, aniline-N-methane-sulfonic acid, o-toluidine, m-toluidine, 2,6-dimethylaniline, 2,5-dimethylaniline, o-ethylaniline, m-ethylaniline, o-tert.-butylaniline, m-chloroaniline, o-anisidine, m-anisidine, o-phenetidine, m-phenetidine, N-methylaniline, N-ethylaniline, N-β-hydroxyethylaniline, N-β-acetoxyethylaniline, N-butylaniline, 4-β-cyanoethylaniline, N-β-cyanoethyl-m-toluidine, N-ethyl-m-toluidine, 2-aminohydroquinone dimethyl or diethyl ether, cresidine, 3-acetylaminoaniline, 3-ureidoaniline, 3-methylsulfonylaminoaniline, 2-methoxy-5-acetylaminoaniline, 1-aminonaphthalene-6-sulfonic acid, 1-aminonaphthalene-7-sulfonic acid, 2-methoxy-1-aminonaphthalene-6-sulfonic acid, 2-ethoxy-1-aminonaphthalene-6-sulfonic acid, 2-amino-5-naphthol-7-sulfonic acid and 2-methylamino-8-naphthol-6-sulfonic acid.

Preferred compounds of the general formula (1) according to the invention which may be mentioned are, for example, the compounds of the following formulae (11) to (25) and salts thereof, preferably alkali metal salts, such as sodium and potassium salts:

the dyestuffs of the general formula (11)

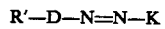

(11)

in which R'—D— denotes a radical of the formulae (9k) to (9p) which is free from NH$_2$ groups, and K is the radical of a compound of the formulae (10f) to (10s), or in which D, as the radical of a diazo component, denotes the benzene nucleus which can be substituted by 1, 2 or 3 substituents belonging to the group comprising lower alkyl, such as methyl and ethyl, lower alkoxy, such as methoxy and ethoxy, hydroxy, carboxy, acetylamino, benzoylamino, phenylamino, sulfobenzoylamino, sulfophenylamino, carbamoyl, carbamoyl which is monosubstituted or disubstituted by lower alkyl and/or phenyl, sulfamoyl, sulfamoyl which is monosubstituted or disubstituted by lower alkyl and/or phenyl, cyano, nitro, chlorine, bromine, trifluoromethyl and sulfo, or D is a naphthalene nucleus, which can be substituted by 1 or 2 sulfonic acid groups and/or by a hydroxy, carboxy, methyl, methoxy, ethoxy or nitro group or a chlorine atom, or D denotes the benzothiazol-2-yl radical which can be substituted in the benzene nucleus by a methyl, methoxy or sulfonic acid group, and K, as the radical of a coupling component, represents the 1- or 2-naphthol radical which can be substituted by 1, 2 or 3 sulfonic acid groups and/or an amino, methylamino, phenylamino, acetylamino, benzoylamino or N-methyl-N-acetylamino group, or K, as the radical of a coupling component, denotes the 1- or 2-aminonaphthalene radical, which can be substituted by 1, 2 or 3 sulfonic acid groups and/or a hydroxy or acetylamino group, or K, as the radical of a coupling component, denotes the 3- or 5-aminopyrazole or 3- or 5-pyrazolone radical, which is substituted in the 5- or 3-position by methyl, carboxy, carbamoyl, lower carbalkoxy, such as carbomethoxy or carbethoxy, or phenyl and in which the phenyl nucleus or naphthyl nucleus is bonded in the 1-position, it being possible for the phenyl radical to be substituted by 1 or 2 sulfonic acid groups and/or 1 or 2 substituents from the group comprising lower alkyl, lower alkoxy, chlorine, bromine, nitro, acetylamino and carboxy, and it being possible for the naphthyl nucleus to be substituted by 1, 2 or 3 sulfo groups and/or a substituent from the group comprising lower alkyl, lower alkoxy, nitro, acetylamino and carboxy, or K, as the radical of a coupling component, represents the acetoacetyl-anilide or -naphthylamide radical, it being possible for the phenyl radical to be substituted by 1 or 2 substituents belonging to the group comprising lower alkyl, such as methyl and ethyl, lower alkoxy, such as methoxy and ethoxy, carboxy, acetylamino, benzoylamino, carbamoyl, carbamoyl which is monosubstituted or disubstituted by lower alkyl and/or phenyl, sulfamoyl, sulfamoyl which is monosubstituted or disubstituted by lower alkyl and/or phenyl, cyano, nitro, chlorine, bromine, trifluoromethyl and sulfo, or K, as the radical of a coupling component, represents the aniline radical which can be substituted in the benzene nucleus by 1 or 2 substituents from the group comprising lower alkyl, lower alkoxy and chlorine or by an amino, methylamino, ethylamino, dimethylamino, diethylamino, ureido or acetylamino group, and which can be monosubstituted or disubstituted by lower alkyl on the nitrogen atom of the aniline, it being possible for these lower alkyl groups to be substituted by a lower alkoxy, lower alkanoyloxy, hydroxy, sulfato, sulfo, carboxy, cyano or phenyl group, or in which the nitrogen atom, in addition to being substituted by one of these alkyl radicals, is substituted by phenyl as a second substituent, the azo group on K being in the ortho-position relative to the hydroxy group dictating the coupling reaction or in the ortho- or para-position relative to the amino group dictating the coupling reaction, and R' represents the radical of the general formula (4), this fiber-reactive radical R' being bonded to one of the aromatic nuclei of D or to one of the lower alkyl substituents thereof;

the dyestuffs of the general formula (12)

D—N=N—K—R'  (12)

in which D denotes a radical of the formulae (10a) to (10d) which is free from $NH_2$ groups and —K—R' is the radical of a compound of the formulae (9a) to (9j), or in which D, as the radical of a diazo component, denotes the benzene nucleus which can be substituted by 1, 2 or 3 substituents belonging to the group comprising lower alkyl, such as methyl and ethyl, lower alkoxy, such as methoxy and ethoxy, hydroxy, carboxy, acetylamino, benzoylamino, phenylamino, sulfobenzoylamino, sulfophenylamino, carbamoyl, carbamoyl which is monosubstituted or disubstituted by lower alkyl and/or phenyl, sulfamoyl, sulfamoyl which is monosubstituted or disubstituted by lower alkyl and/or phenyl, cyano, nitro, chlorine, bromine, trifluoromethyl and sulfo, or D is a naphthalene nucleus which can be substituted by 1, 2 or 3 sulfonic acid groups and/or a hydroxy, carboxy, methyl, methoxy, ethoxy, nitro or acetylamino group or a chlorine atom, or D denotes the benzothiazol-2-yl radical which can be substituted in the benzene nucleus by a nitro, methyl, methoxy or sulfonic acid group, and K represents the radical of 1- or 2-naphthol, which can be substituted by 1, 2 or 3 sulfonic acid groups, or K denotes the radical of 1- or 2-amino-naphthalene or is naphthylene, which can be substituted by 1, 2 or 3 sulfonic acid groups and/or a hydroxy group, or K denotes the 5-aminopyrazol-4-yl radical or 5-pyrazolon-4-yl radical, which is substituted in the 3-position by methyl, carboxy, carbamoyl, lower carbalkoxy, such as carbomethoxy or carbethoxy, or phenyl and in which the phenyl nucleus or naphthyl nucleus is bonded in the 1-position, it being possible for the phenyl radical to be substituted by 1 or 2 sulfonic acid groups and/or 1 or 2 substituents from the group comprising lower alkyl, lower alkoxy, chlorine, bromine, nitro, acetylamino and carboxy and it being possible for the naphthyl nucleus to be substituted by 1, 2 or 3 sulfo groups and/or a substituent from the group comprising lower alkyl, lower alkoxy, nitro, acetylamino and carboxy, or K, as the radical of a coupling component, represents the acetoacetyl-anilide or -naphthylamide radical, it being possible for the phenyl radical to be substituted by 1 or 2 substituents belonging to the group comprising lower alkyl, such as methyl and ethyl, lower alkoxy, such as methoxy and ethoxy, carboxy, acetylamino, benzoylamino, carbamoyl, carbamoyl which is monosubstituted or disubstituted by lower alkyl and/or phenyl, sulfamoyl, sulfamoyl which is monosubstituted or disubstituted by lower alkyl and/or phenyl, cyano, nitro, chlorine, bromine, trifluoromethyl and sulfo, or K represents the p-phenylene radical which can be substituted by 1 or 2 substituents from the group comprising lower alkyl, lower alkoxy and chlorine or by a dimethylamino, diethylamino, ureido or acetylamino group, and R' represents the radical of the general formula (4), this fiber-reactive radical R' being bonded to one of the aromatic nuclei of K or to one of the lower alkyl substituents thereof;

the dyestuffs of the general formula (13)

R'—D—N=N—E—N=N—K  (13)

in which D and R', or R'—D—, and K have the meanings given in the case of the general formula (11), and E, as the middle component which serves first as the coupling component and then as the diazo component when the dyestuffs are built up, represents the corresponding bivalent radical of the formulae $(10t_1)$ to $(10z)$, and in particular, for example, denotes the phenylene radical, which can be substituted by a substituent from the group comprising lower alkyl, lower alkoxy, chlorine, acetylamino, amino, methylamino, ethylamino, dimethylamino, diethylamino and ureido, or denotes the naphthalene nucleus, which is substituted by an amino or hydroxy group in the ortho- or para-position relative to the first azo group and which can be substituted by a lower alkyl, nitro or acetylamino group and/or by 1 or 2 sulfonic acid groups, or denotes the radical of the formula

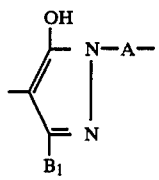

in which $B_1$ represents the methyl or carboxy group and A denotes the benzene or naphthalene nucleus, which can be further substituted by 1 or 2 substituents from the group comprising sulfo, carboxy, lower alkyl, lower alkoxy and chlorine;

the dyestuffs of the general formula (14)

D—N=N—E—N=N—K—R'  (14)

in which D and K and R', or —K—R', have the meanings given in the case of the general formula (12) and E has the meaning given in the case of the general formula (13);

the dyestuffs of the general formula (15)

$(R')_{m'}$—D—N=N—$K_1$—N=N—D—$(R')_{m''}$  (15)

in which R' represents the fiber-reactive radical of the general formula (4), m' and m" are identical or different and each represent the number 0 or 1, the sum (m'+m") being the number 1 or 2, D has the meanings given in the case of the general formula (11) or (12), depending on whether a fiber-reactive radical R' is bonded to D, and $K_1$, as the radical of a bifunctional coupling component, represents the amino-hydroxynaphthylene radical, which can be substituted by one or two sulfo groups, or represents the diamino-phenylene radical, which can be further substituted by a methyl or sulfo group;

the dyestuffs of the general formula (16)

$$(R')_{m'}-K-N=N-D_1-N=N-K-(R')_{m''} \quad (16)$$

in which R' denotes the fiber-reactive radical of the general formula (4), m' and m'' have the meanings given in the case of the general formula (15), K has the meaning given in the case of the general formula (11) or (12), depending on whether a fiber-reactive radical R' is bonded to K, and $D_1$ represents the phenylene radical, which can be substituted by a sulfo or methyl group, or the radical of the formula

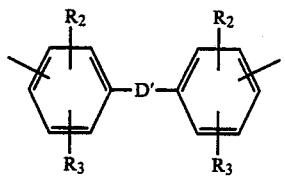

in which $R_2$, $R_3$ and D' have the abovementioned meanings;

the dyestuffs of the general formula (17)

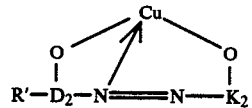

and their corresponding 1:2 chromium complex and 1:2 cobalt complex derivatives; in the formula (17), $D_2$ denotes the benzene nucleus which can be substituted by 1 or 2 substituents belonging to the group comprising lower alkyl, such as methyl and ethyl, lower alkoxy, such as methoxy and ethoxy, carboxyl, phenylamino, sulfobenzoylamino, sulfophenylamino, carbamoyl, carbamoyl which is monosubstituted or disubstituted by lower alkyl and/or phenyl, sulfamoyl, sulfamoyl which is monosubstituted or disubstituted by lower alkyl and/or phenyl, cyano, nitro, chlorine, bromine, trifluoromethyl and sulfo, or denotes the naphthalene nucleus, which can be substituted by 1, 2 or 3 sulfonic acid groups and/or a carboxy, methyl, methoxy, ethoxy, nitro or acetylamino group or a chlorine atom, the complexing oxygen atom in $D_2$ being bonded in the ortho-position relative to the azo group, and $K_2$ denotes the naphthylene radical which can be substituted by 1, 2 or 3 sulfonic acid groups and/or an amino, methylamino, phenylamino, acetylamino, benzoylamino or N-methyl-N-acetylamino group, or $K_2$ denotes the pyrazol-4,5-ylene radical which is substituted in the 3-position by methoxy, carboxyl, carbamoyl, lower carbalkoxy, such as carbomethoxy or carbethoxy, or phenyl and in which the phenyl nucleus or naphthyl nucleus is bonded in the 1-position, it being possible for the phenyl radical to be substituted by 1 or 2 sulfonic acid groups and/or 1 or 2 substituents from the group comprising lower alkyl, lower alkoxy, chlorine, bromine, nitro, acetylamino and carboxy and it being possible for the naphthyl nucleus to be substituted by 1, 2 or 3 sulfo groups and/or a substituent from the group comprising lower alkyl, lower alkoxy, nitro, acetylamino and carboxy, or $K_2$, as the radical of a coupling component, denotes that of acetoacetyl-anilide or -naphthylamide, it being possible for the phenyl radical to be substituted by 1 or 2 substituents belonging to the group comprising lower alkyl, such as methyl and ethyl, lower alkoxy, such as methoxy and ethoxy, carboxy, acetylamino, benzoylamino, carbamoyl, carbamoyl which is monosubstituted or disubstituted by lower alkyl and/or phenyl, sulfamoyl, sulfamoyl which is monosubstituted or disubstituted by lower alkyl and/or phenyl, cyano, nitro, chlorine, bromine, trifluoromethyl and sulfo, the complexing oxygen atom in $K_2$ being bonded in the ortho-position relative to the azo group, and R' denotes the radical of the general formula (4), this fiber-reactive radical R' being bonded to one of the aromatic nuclei of $D_2$ or to one of the lower alkyl substituents thereof;

the dyestuffs of the general formula (18)

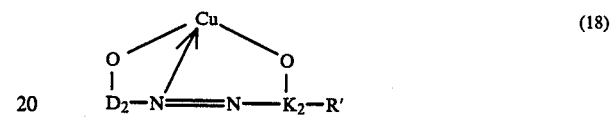

and their corresponding 1:2 chromium complex and 1:2 cobalt complex derivatives; in the formula (18), $D_2$ denotes the benzene nucleus which can be substituted by 1, 2 or 3 substituents belonging to the group comprising lower alkyl, such as methyl and ethyl, lower alkoxy, such as methoxy and ethoxy, carboxy, acetylamino, benzoylamino, phenylamino, sulfobenzoylamino, sulfophenylamino, carbamoyl, carbamoyl which is monosubstituted or disubstituted by lower alkyl and/or phenyl, sulfamoyl, sulfamoyl which is monosubstituted or disubstituted by lower alkyl and/or phenyl, cyano, nitro, chlorine, bromine, trifluoromethyl and sulfo, or $D_2$ denotes the naphthalene nucleus, which can be substituted by 1, 2 or 3 sulfonic acid groups and/or a carboxy, methyl, methoxy, ethoxy, nitro or acetylamino group or a chlorine atom, the complexing oxygen atom in $D_2$ in each case being bonded in the ortho-position relative to the azo group, and $K_2$ denotes the naphthylene radical which can be substituted by 1 or 2 sulfonic acid groups, or $K_2$ denotes the pyrazol-4,5-ylene radical which is substituted in the 3-position by methyl, carboxy, carbamoyl, lower carbalkoxy, such as carbomethoxy or carbethoxy, or phenyl and in which the phenyl nucleus or naphthyl nucleus is bonded to the 1-position, it being possible for the phenyl radical to be substituted by 1 or 2 sulfonic acid groups and/or 1 or 2 substituents from the group comprising lower alkyl, lower alkoxy, chlorine, bromine, nitro, acetylamino and carboxy and it being possible for the naphthyl nucleus to be substituted by 1, 2 or 3 sulfo groups and/or a substituent from the group comprising lower alkyl, lower alkoxy, nitro, acetylamino and carboxy, of $K_2$, as the radical of a coupling component, represents the acetoacetyl-anilide or -naphthylamide radical, it being possible for the phenyl radical to be substituted by 1 or 2 substituents belonging to the group comprising lower alkyl, such as methyl and ethyl, lower alkoxy, such as methoxy and ethoxy, carboxy, acetylamino, benzoylamino, carbamoyl, carbamoyl which is monosubstituted or disubstituted by lower alkyl and/or phenyl, sulfamoyl, sulfamoyl which is monosubstituted or disubstituted by lower alkyl and/or phenyl, cyano, nitro, chlorine, bromine, trifluoro methyl and sulfo, the complexing oxygen atom in $K_2$ being bonding in the ortho-position relative to the azo group, and R' denotes the radical of the general formula (4), this fiber-reactive radical R' being bonded to one of the aromatic nuclei of $K_2$ or to one of the lower alkyl substituents thereof;

the dyestuffs of general formula (19)

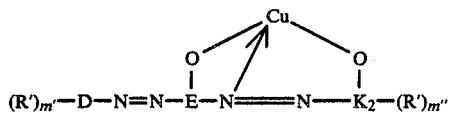 (19)

and their corresponding 1:2 chromium complex and 1:2 cobalt complex derivatives; in the formula (19), R', m', m", D and $K_2$ have the meanings given in the case of the general formulae (11), (15) and (17) or (18) and E, as the middle component which serves first as the coupling component and then as the diazo component when the dyestuffs are built up, represents the benzene nucleus which can be substituted by a substituent from the group comprising lower alkyl, lower alkoxy, chlorine, acetylamino, dimethylamino, diethylamino and ureido, or represents the naphthalene nucleus which can be substituted by lower alkyl, nitro, acetylamino or sulfo, or represents the radical of the formula

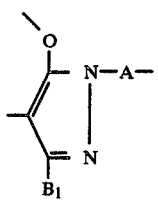

in which A and $B_1$ have the meanings given in the case of formula (13), the complexing oxygen atom in $K_2$ being bonded in the ortho-position relative to the azo group;

the dyestuffs of the general formula (20)

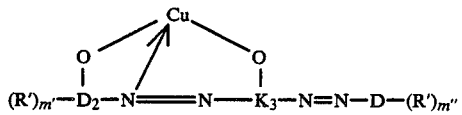 (20)

and their corresponding 1:2 chromium complex and 1:2 cobalt complex derivatives; in this formula (20), R', m', m''', D and $D_2$ have the meanings given in the case of the formulae (15) and (17) or (18), the complexing oxygen atom in $D_2$ being in the ortho-position relative to the azo group, and $K_3$, as the radical of the bifunctional coupling component, represents the naphthylene radical to which one or two sulfo groups can be bonded;

the dyestuffs of the general formula (21)

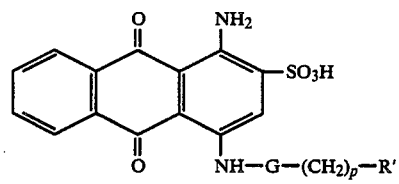 (21)

in which G represents the phenylene or naphthylene radical or the bivalent radical of diphenyl sulfone, stilbene, diphenylamine, diphenylmethane or azobenzene, it being possible for each of the aromatic nuclei of G to be further substituted by 1 or 2 substituents from the group comprising sulfo, lower alkyl, lower alkoxy, chlorine and carboxy, and R' and p have the abovementioned meanings;

the dyestuffs of the general formula (22)

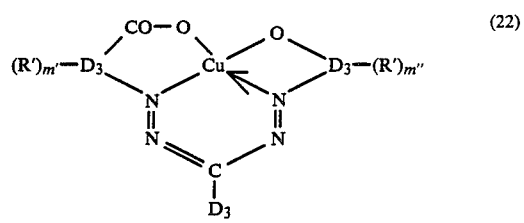 (22)

in which the radicals $D_3$ are in each case identical or not all the same and are the benzene nucleus which can be substituted by 1 or 2 substituents from the group comprising sulfo, carboxy, nitro, lower alkyl, lower alkoxy and chlorine, or are the naphthalene nucleus, which can be substituted by 1, 2 or 3 substituents from the group comprising sulfo, carboxy, nitro, acetylamino and chlorine, and R', m' and m" have the meanings given in the case of the formulae (11) and (12) or (15);

the dyestuffs of the general formula (23)

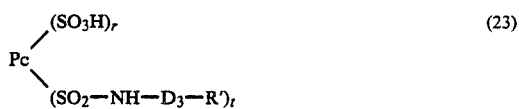 (23)

in which $D_3$ has the abovementioned meaning, Pc denotes a metal-free or metal-containing phthalocyanine radical, preferably the copper, cobalt or nickel phthalocyanine radical, R' represents the fiber-reactive radical of the general formula (4), r denotes a number between 1 and 3 and t denotes a number between 1 and 4, the sum (r+t) being at most 4 and, in the case where t represents the number 4, the radical $D_3$ necessarily containing at least one sulfo group;

the dyestuffs of the general formula (24)

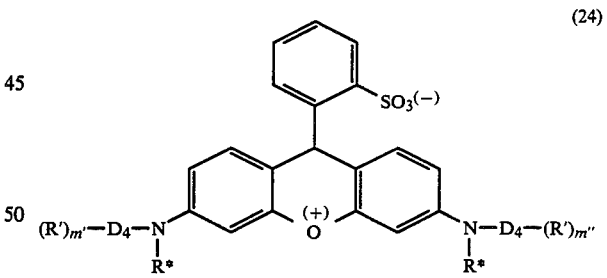 (24)

in which the radicals $D_4$ can be identical or not all the same and are a lower alkylene radical which can be substituted by a lower alkoxy, lower alkanoyloxy, cyano, sulfo, carboxy or hydroxy group, or have the abovementioned meaning of $D_3$, and R*, R', m' and m" have the abovementioned meanings;

the dyestuffs of the general formula (25)

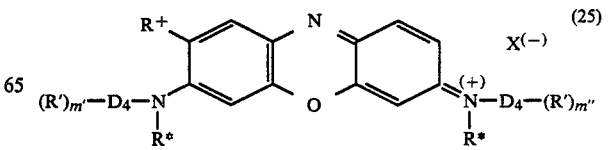 (25)

in which $D_4$, $R^*$, $R'$, $m'$ and $m''$ have the abovementioned meanings, $R^+$ represents a hydrogen atom, a lower alkyl group, such as the methyl group, or a lower alkoxy group, such as the methoxy group, and $X^{(-)}$ denotes a colorless anion.

Further preferred compounds of the general formula (1) according to the invention are the dyestuffs of the general formula (11) in which the radical R'—D— represents a fiber-reactive radical of the general formula (26a), (26b), (26c), (26d), (26e) or (26f)

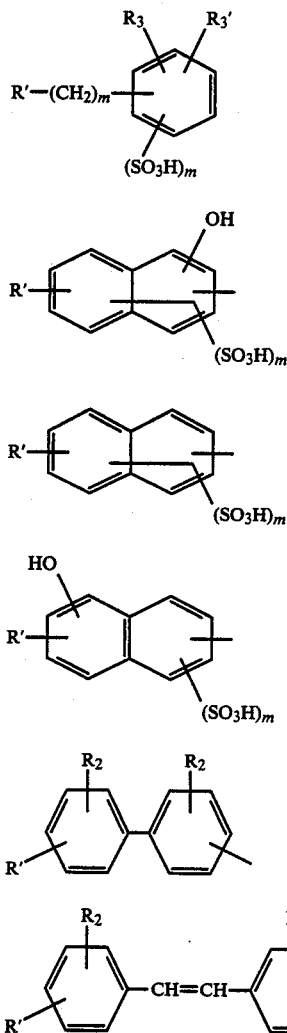

in which $R_2$, $R_3$, $R_3'$, m and R' have the abovementioned meanings, and the radical —K represents a radical of the general formula (27a), (27b), (27c), (27d), (27e), (27f), (27g), (27h), (27i), (27j), (27k), (27m), (27n), (27p) or (27q)

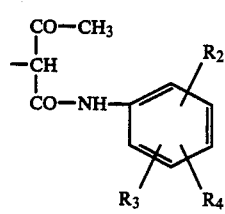

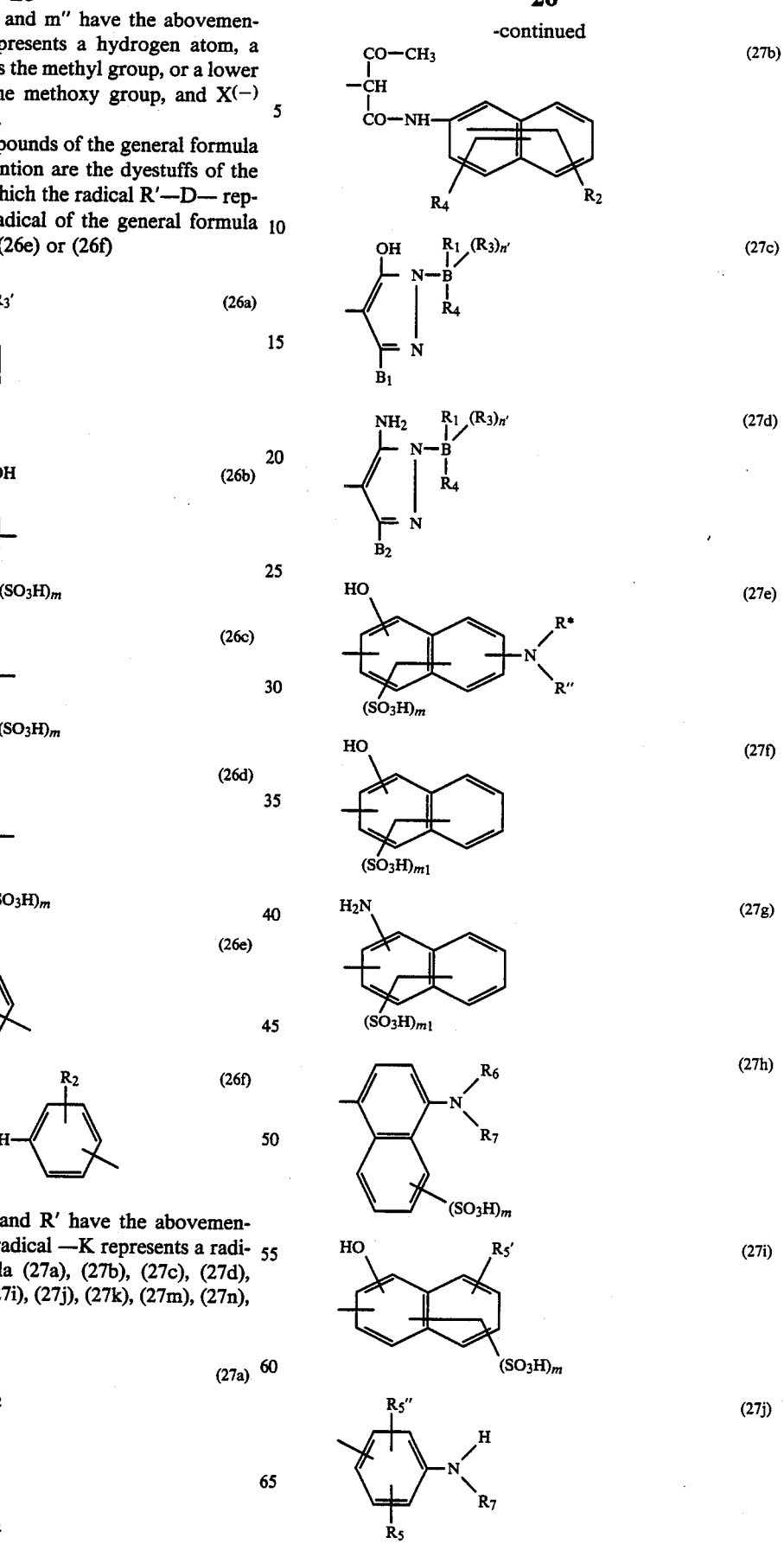

-continued

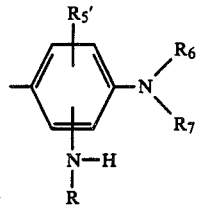 (27k)

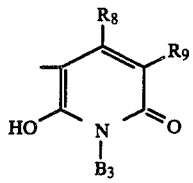 (27m)

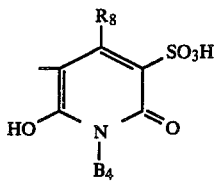 (27n)

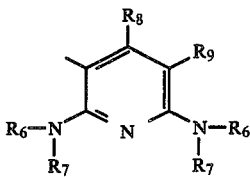 (27p)

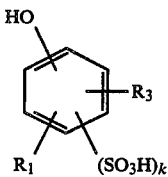 (27q)

in which R, $R_1$, $R_2$, $R_3$, $R_4$, $R_5$, $R_6$, $R_7$, $R_8$, $R_9$, $R_5'$, $R_5''$, R*, R", k, m, $m_1$, n', B, $B_1$, $B_2$, $B_3$ and $B_4$ have the abovementioned meanings, and furthermore the dyestuffs of the general formula (12) in which D represents a radical of the general formula (27r), (27s), (27t) or (27u)

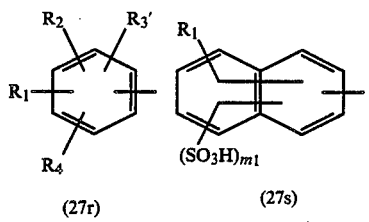

(27r)  (27s)

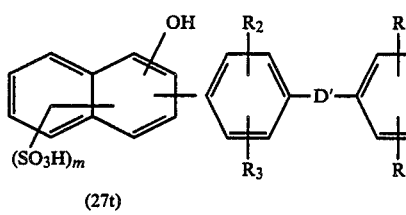

(27t)  (27u)

in which $R_1$, $R_2$, $R_3$, $R_4$, D', m and $m_1$ have the abovementioned meaning, and the fiber-reactive radical —K—R' denotes a radical of the general formula (26g), (26h), (26i), (26j), (26k), (26m), (26n), (26p) or (26r)

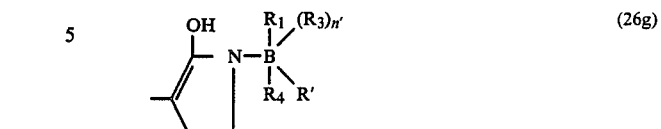 (26g)

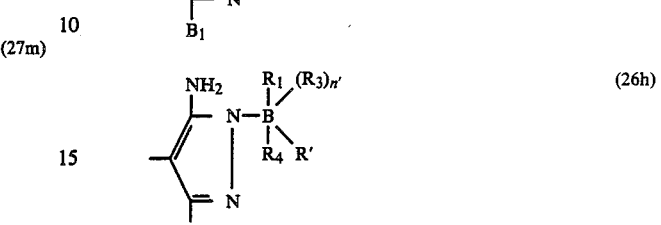 (26h)

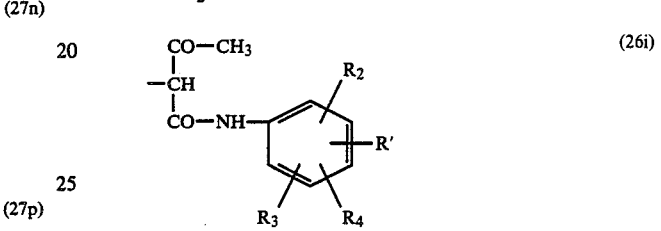 (26i)

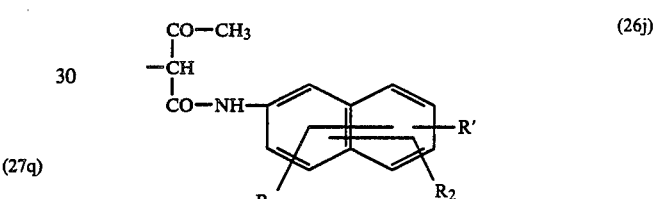 (26j)

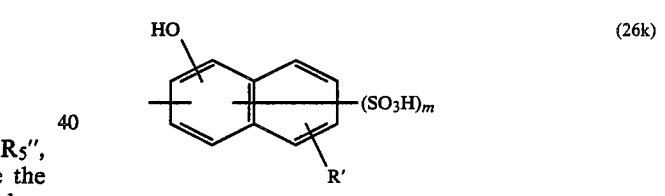 (26k)

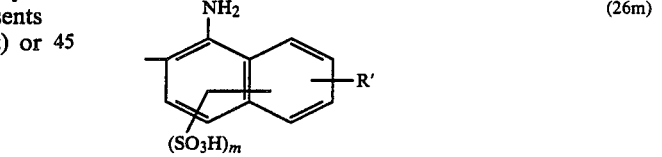 (26m)

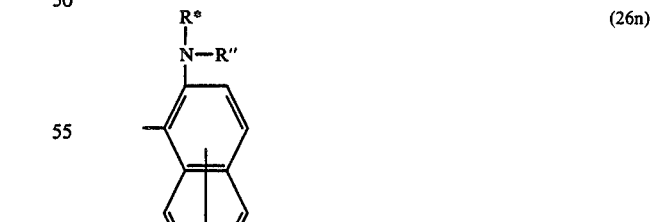 (26n)

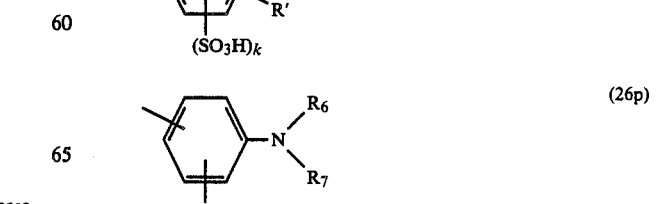 (26p)

-continued

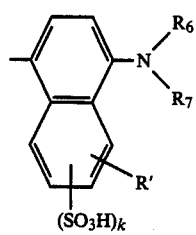 (26r)

in which R', R$_1$, R$_2$, R$_3$, R$_4$, R$_5$, R$_6$, R$_7$, k, m, n', B, B$_1$, B$_2$, R" and R* have the abovementioned meanings, and furthermore the dyestuffs of the general formula (13), in which the radical R'—D— denotes one of the radicals of the general formula (26a), (26b), (26c), (26d), (26e) or (26f) above and the radical —K denotes one of the radicals of the abovementioned formula (27a), (27b), (27c), (27d), (27e), (27f), (27g), (27h), (27i), (27j), (27k), (27m), (27n), (27p) or (27q) and the radical E represents a radical of the general formula (28a), (28b) or (28c)

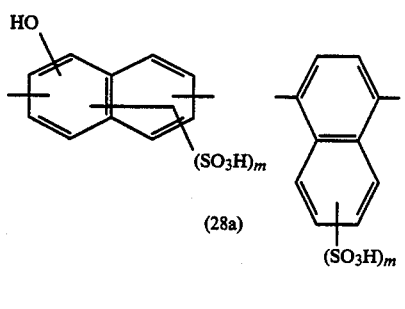

(28a)

(28b)

(28c)

in which R$_5$, R$_5$" and m have the abovementioned meanings, and furthermore the dyestuffs of the general formula (14), in which the radical D denotes a radical of the formula (27r), (27s), (27t) or (27u) above, the radical —K—R' denotes a radical of the formula (26g), (26h), (26i), (26j), (26k), (26m), (26n), (26p) or (26r) above and the radical E denotes a radical of the formula (28a), (28b) or (28c) above, and furthermore the dyestuffs of the general formula (15) and of the general formula (16), in which m' and m" have the abovementioned meanings and the radical D, if m' or m" represents the number zero, and the radicals R'—D— and —D—R', if m' or m" represents the number 1, denote the above formulae (27r), (27s), (27t) or (27u) and (26a) to (26f) just mentioned, the radical K, if m' or m" represents the number zero, and the radicals R'—K— and —K—R', if m' or m" represents the number 1, denote the above radicals (27a) to (27q) and the radicals (26g) to (26r) just mentioned, K$_1$ denotes the naphthylene radical which is substituted by an amino group in one aromatic nucleus and by a hydroxy group in the second aromatic nucleus and which can be further substituted by one or two sulfo groups, and D$_1$ has the meaning given above in the case of the general formula (16), and furthermore the dyestuffs of the general formula (17), in which the radical

is a radical of the general formula (29a) or (29b)

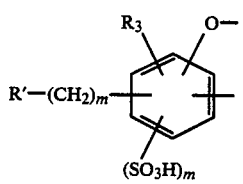 (29a)

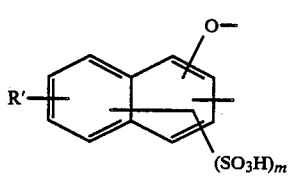 (29b)

in which R', m and R$_3$ have the abovementioned meanings, and in which the radical

represents a radical of the general formula (29c), (29d), (29e), (29f) or (29g)

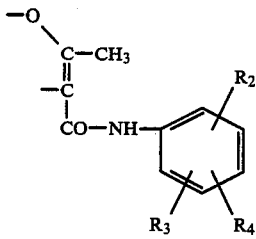 (29c)

(29d)

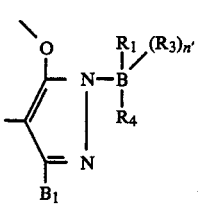 (29e)

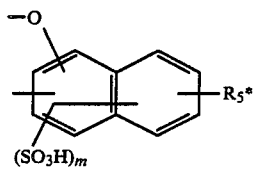
(29f)

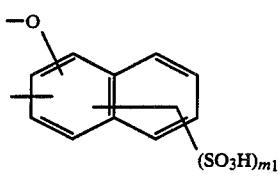
(29g)

in which $R_1$, $R_2$, $R_3$, $R_4$, B, $B_1$, m and $m_1$ have the above-mentioned meanings, the complexing oxygen atoms in each case being bonded in the ortho-position relative to the azo groups, and $R_5^*$ represents a hydrogen atom or has the meaning of $R_5'$ above, and furthermore the dyestuffs of the general formula (18), in which the radical

represents a radical of the general formula (29h) or (29i)

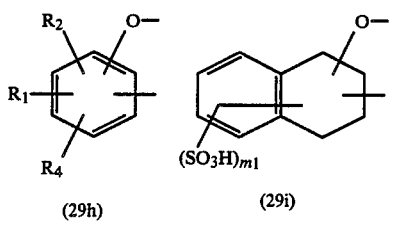
(29h)      (29i)

in which $R_1$, $R_2$, $R_4$ and $m_1$ have the abovementioned meanings, and in which the radical

represents a radical of the general formula (29j), (29k), (29m) or (29n)

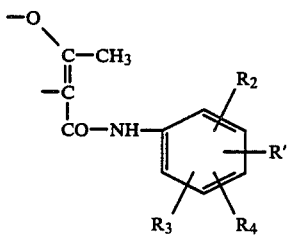
(29j)

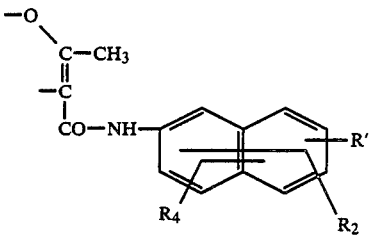
(29k)

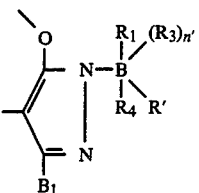
(29m)

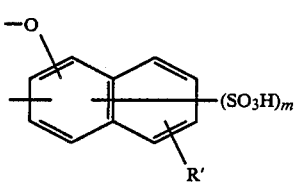
(29n)

in which R', $R_1$, $R_2$, $R_3$, $R_4$, B, $B_1$, m and n' have the abovementioned meanings, the complexing oxygen atoms in each case being bonded in the ortho-position relative to the azo groups, and furthermore the dyestuffs of the general formulae (19) and (20), in which m' and m" have the abovementioned meanings and the radical D, if m' or m" represents the number zero, or the radical R'—D— and —D—R', if m' or m" denotes the number 1, denote the abovementioned radicals of the formulae (27q) to (27s) and (26a) to (26f), the radicals

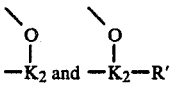

denote one of the abovementioned radicals of the general formula (29c) to (29g) and (29j) to (29n) and the radicals

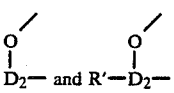

denote one of the radicals of the abovementioned formulae (29h) or (29i) and (29a) or (29b), and the radical

denotes the following radical

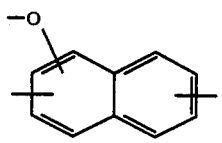

it being possible for this naphthylene nucleus to be further substituted by 1 or 2 sulfo groups, and the radical $-\overset{-O}{\underset{|}{K_3}}-$ denotes a radical of the following formula

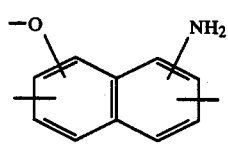

it being possible for the naphthylene nucleus to be further substituted by 1 or 2 sulfo groups.

Organic compounds of the general formula (2) with which the compounds of the general formula (1) according to the invention are obtained by reaction with a fiber-reactive acid halide of the general formula (3) are preferably the monoamino and diamino compounds of the general formulae (30) to (44):

| R—NH—D—N=N—K, | (30) |
| R—NH—D—N=N—E—N=N—K, | (32) |
| (R—NH)$_{m'}$—D—N=N—K$_1$—N=N—D—(NH—R)$_{m''}$, | (34) |

| D—N=N—K—NH—R, | (31) |
| D—N=N—E—N=N—K—NH—R, | (33) |
| (R—NH)$_{m'}$—K—N=N—D$_1$—N=N—K—(NH—R)$_{m''}$, | (35) |

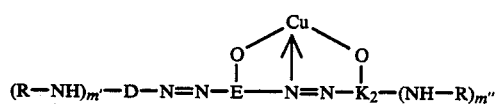   (36)

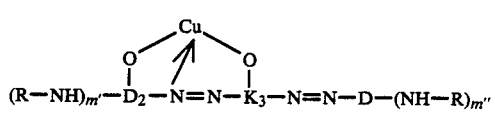   (37)

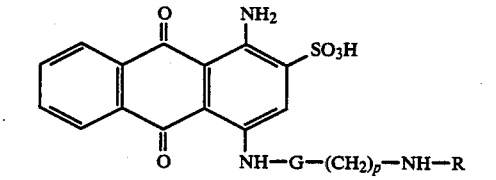   (38)

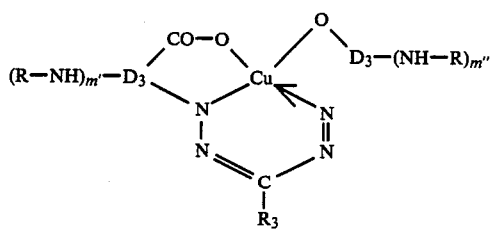   (39)

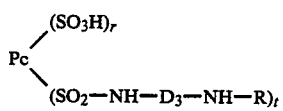   (40)

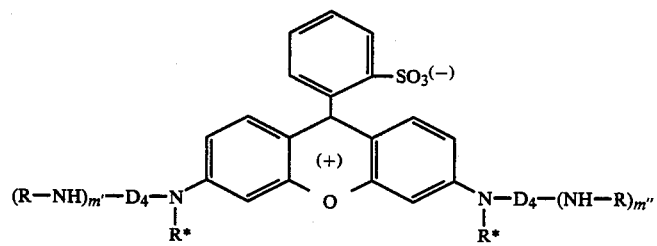   (41)

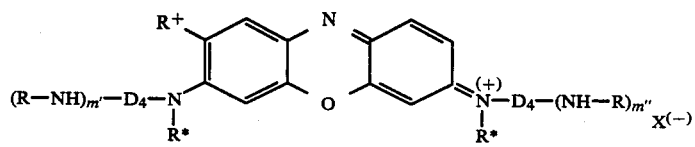   (42, 43)

   (44)

in which R, D, E, K, D$_1$, D$_2$, K$_1$, K$_2$, K$_3$, m', m''', G, p, D$_3$, Pc, r, t, D, R$^+$, R* and X$^{(-)}$ have the meanings given above in the case of the general formulae (11) to (25).

Of the individual compounds of the general formula (1) according to the invention, the compounds described in Examples 9, 11, 60, 66, 112 and 155, and in particular in Examples 6, 7, 8 and 209, which follow, may be singled out in particular.

The compounds of the general formula (1) according to the invention can be isolated from their synthesis solutions by methods which are generally known for water-soluble compounds, thus, for example, by precipitation from the reaction medium by means of an electrolyte, such as, for example, sodium chloride or potassium chloride, or by evaporation of the reaction solution itself, for example by spray-drying. If the latter type of isolation of the compound of the general formula (1) is chosen, it is frequently advisable for any amounts of sulfate present in the solutions to be removed before the evaporation, by precipitation as calcium sulfate and separation by filtration.

In some cases, the aqueous solution of the compound of the general formula (1) can also be used directly as a liquid preparation, if necessary after adding a buffer substance, for fiber-finishing, such as, for example, for dyeing, if Q represents a dyestuff radical.

The compounds of the general formula (1) according to the invention are suitable for finishing leather or materials of natural, regenerated or synthetic nitrogen-containing fibers or of natural, regenerated or synthetic fibers containing hydroxy groups, depending on the properties of the radical Q. The fiber-reactive anchor in the compounds of the general formula (1) has the property of undergoing covalent bonding with NH groups and OH groups—in the case of hydroxy groups, preferably in the alkaline range—the chlorine atom being split off from the $\beta$-chloroethylsulfonylmethyl radical, and thus of producing a true bond with the fiber.

The present invention thus also relates to the use of the compounds of the general formula (1) for finishing the fibers of materials of natural, regenerated or synthetic nitrogen-containing, in particular carbonamide group-containing, fibers, or of natural, regenerated or synthetic fibers containing hydroxy groups, or of leather, and to a process for finishing the fibers of such materials (substrates), which comprises applying a compound of the general formula (1) to the substrate, preferably from aqueous solution, and fixing it onto the substrate, if necessary under the action of an alkali and of heat.

Nitrogen-containing fiber materials are, for example, fibers of synthetic polyurethanes or polyamides, such as polyamide 6.6, polyamide 6, polyamide 11 and polyamide 4, and natural fiber materials of polyamides, such as silk and wool and other animal hair.

Fiber materials containing hydroxy groups are, in particular, cellulose fiber materials, preferably cotton and other vegetable fibers, such as linen, hemp and jute, and furthermore the corresponding fibers of regenerated cellulose, such as, for example, viscose or cuprammonium rayon.

The compounds according to the invention can be applied to the substrates mentioned by the application techniques which are generally known for fiber-reactive compounds, for example those which are generally known for fiber-reactive dyestuffs. Thus, in general, a procedure is followed in which the compounds of the general formula (1) are applied to the substrate in aqueous solution if appropriate in the presence of a customary thickener and/or if appropriate other auxiliaries, which, for example, can improve the affinity, the leveling power and the migration ability, it being possible for the aqueous solution of the compound of the general formula (1) to be rendered weakly acid, neutral or alkaline.

The compounds of the general formula (1) are applied to natural, regeneratd or synthetic polyamide fibers or polyurethane fibers or to the fibers of leather in the customary manner from an aqueous acid to aqueous neutral solution (pH range from about 3 to 6.5), preferably by the exhaustion methods, and are fixed on these fibers under the influence of heat, in particular at a temperature between 60° and 130° C. Thus, for example, it is possible to add acetic acid or acetic acid and ammonium acetate as a buffer to the bath containing the compound of the general formula (1) in order to obtain the desired pH value. Addition of customary leveling agents, for example those based on a reaction product of cyanuric chloride and three times the molar amount of an aminobenzenesulfonic acid and/or an aminonaphthalenesulfonic acid and/or based on a reaction product of stearylamine and ethylene oxide, is recommended for the purpose of achieving dyeings with a useful levelness. The compound according to the invention can be applied to and fixed on the substrate by the exhaustion process either at the boiling point or at a higher temperature, such as, for example, at 105° to 120° C., under pressure. It is expedient for the dyeing to be started with a slow increase in temperature to 60° C. and, after some time, for the temperature to be increased slowly to a higher temperature.

For the finishing of fiber materials containing hydroxy groups, the compound of the general formula (1) is as a rule applied to the fiber from a weakly acid to alkaline solution and is fixed on the fiber in the presence of an alkaline agent, which is subsequently added to the aqueous solution, if necessary, or applied to the fiber.

Finished fiber materials on which the compounds of the general formula (1) have good wet fastness properties are obtained in this manner.

In detail, for example, using customary methods for application of fiber-finishing fiber-reactive compounds and fixing thereof to the fiber, numerous of which methods, in particular for fiber-reactive dyestuffs, are described in the literature, the procedure can be, for example, as follows:

For fiber-finishing fiber materials containing hydroxy groups, such as, for example, cellulose, the material is padded with a solution of the compound of the general formula (1) and, if necessary after intermediate drying, the padded material is overpadded with an alkaline solution or passed through an alkaline bath; these alkaline solutions can be at room temperature or at a higher temperature, for example a temperature between 15° and 80° C.

Alkaline substances which can be used in these fixing solutions are, for example, sodium hydroxide, sodium carbonate, sodium bicarbonate, potassium hydroxide, potassium carbonate, trisodium phosphate or sodium or potassium silicate or waterglass. The goods thus treated under alkaline conditions are then either laid down at a temperature between 20° and 50° C. (for example plaited down or wound on a beam) and left under these conditions for several hours in order for the compound of the general formula (1) to be fixed, or are subsequently exposed to the action of moist or dry heat (thus, for example, by means of hot steam, hot air or infrared radiation), for fixing of the compound according to the invention. In the case of thermal fixing, it is also possible for compounds which only achieve their alkaline action under the influence of heat, such as, for example, sodium acetate, sodium formate and sodium trichloroacetate, to be used as the alkalis.

However, it is also possible for the alkaline agents already to be added to the aqueous dyestuff solution. In this case, the fiber material is treated in an aqueous-alkaline solution of the compound of the formula (1), advantageously with the addition of an electrolyte, such as sodium chloride or sodium sulfate, at elevated temperatures, such as, for example, at a temperature between 30° and 110° C., it being advantageous for the treatment of the fiber to be started whilst the temperature of the exhaustion bath is slowly increased to 60° C. and for the fixing subsequently to be continued and brought to completion at temperatures of up to 110° C. It is also possible for the fiber, such as, for example, the cellulose fiber, to be pretreated with a solution of an alkaline compound and then, if necessary after intermediate drying, to be impregnated with an aqueous solution of the compound of the formula (1), and for the fiber-reactive compound then to be fixed on the fiber at room temperature, but preferably under a heat treatment.

If the compounds of the general formula (1) are applied to the fiber material in the form of printing pastes, it is usual to employ thickeners, such as sodium alginate, carob bean flour ether, cellulose ether, tragacanth or gum arabic, if appropriate with the addition of a customary printing auxiliary and the above-mentioned alkaline compounds. These prints are then treated with hot air at a temperature between 70° and 230° C., preferably between 100° and 150° C. (thermofixed), or steamed. The compounds of formula (1) can thus be applied to the cellulose fiber by customary printing processes such as either in a one-phase procedure by means of a printing paste containing sodium bicarbonate or one of the other abovementioned alkaline agents, with subsequent fixation of the compound of the formula (1) by steaming at 101° to 103° C., or they can be applied to the fiber in a two-phase process, first using a neutral or weakly acid printing paste, after which they are then fixed on the fiber either by a procedure in which the printed material is passed through a hot alkaline bath containing electrolytes or is overpadded with an alkaline liquor containing electrolytes and is subsequently left to stand, or by a heat treatment. If an electrolyte-containing alkaline bath, through which the material impregnated with the compound according to the invention is passed for fixing, is used, the bath temperature is 60° to 105° C., so that subsequent treatment by hot air or steam can be dispensed with. If the material impregnated with the compound according to the invention is treated with a strong aqueous alkali, such as, for example, sodium hydroxide or potassium hydroxide and/or sodium silicate or potassium silicate or trisodium phosphate, it is sufficient, for fixing the compounds according to the invention, for the moist goods, preferably prints, which have been impregnated with alkali to be left to stand at room temperature for a relatively long period.

The fiber-finished materials thus obtained are then after-treated, rinsed and dried, in the customary manner. The materials which have been fiber-finished in this manner with the compounds according to the invention exhibit outstanding wet fastness properties, which are especially advantageous, in particular, when compounds according to the invention in which the fiber-finishing organic radical Q is the radical of a dyestuff molecule are used; examples of the good wet fastness properties of the fiber-finished substrates which are to be mentioned in particular are their fastness to boiling with sodium carbonate, fastness to washing at 60° and 95° C., fastness to washing with peroxide, such as, for example, at 95° C., fastness to alkaline and acid perspiration, fastness to water (severe), fastness to chlorinated water, fastness to acid and alkali and fastness to crossdyeing. The materials which have been fiber-finished with the compound of the general formula (1) also have a good fastness to solvents, good fastness to rubbing and good fastness to waste gases. The fastness to lights of the substrate, in particular of the fiber materials finished with dyestuffs according to the invention, in the dry and moist state is likewise good. Moreover, using dyestuffs according to the invention, the contour sharpness of the prints is good and the white ground is very pure. The dyeings and prints are also insensitive to the effect of a short period of dry heat, such as, for example, to a dry heat treatment at 220° C. for 30 seconds; neither an irreversible change in color shade nor destruction of the dyestuff by thermal cracking takes place. The compounds of the general formula (1) according to the invention generally have very good affinity and exhibit a high degree of fixation. The compounds according to the invention are fixed on the different fiber materials of a cotton/viscose staple mixed fabric in the same intensity; thus they have the same shade and depth of color on these fiber materials. After-treatment of the dyed or printed fiber materials, such as, for example, with a creaseproof finish ("wash-and-wear" finish), does not affect the shade of the dyeings.

The following examples serve to illustrate the invention. The parts given in these examples are parts by weight, and the percentage data relate to percentage by weight, unless otherwise indicated. Parts by volume bear the same relationship to parts by weight as liter to kilogram.

EXAMPLE 1

272 parts of 4-methyl-benzoic acid are dissolved in 750 parts of chlorobenzene at 100° C. and are chlorinated at this temperature by the introduction of elementary chlorine under UV light; the chlorination process is ended when 71 parts of hydrochloric acid have been formed. The reaction mixture is then cooled to about 0° C., with stirring, and the precipitate which has separated out is filtered off, freed from chlorobenzene by being washed several times with low-boiling petroleum ether and dried. 307 parts of 4-(chloromethyl)-benzoic acid with a melting point of 196° to 200° C. are obtained.

This product is first reacted with 163 parts by volume of 2-mercapto-ethanol in alkaline aqueous solution at a pH value between 8 and 10 and at a temperature of 60° C. This solution is then adjusted to a pH value between 4 and 7 and the oxidation reaction is carried out in this pH range by means of the addition of 635 parts by volume of 30% strength aqueous hydrogen peroxide at a temperature of 60° C. up to the boiling point of the aqueous reaction solution, and advantageously in the presence of catalytic amounts of tungstic acid. The 4-(β-hydroxyethylsulfonyl)-methyl-benzoic acid thus prepared is precipitated by acidification of the reaction batch, for example by means of concentrated hydrochloric acid, and is isolated.

480 parts of an approximately 80% pure product which has a melting point of 205° to 210° C. are obtained. The product can be purified by reprecipitation from a neutral aqueous solution or by recrystallization from water or water/ethanol; 360 parts of an approximately 98% pure product which has a melting point of 215° to 218° C. are obtained in this manner.

This product is suspended in a mixture of 750 parts by volume of thionyl chloride and 3 parts by volume of triethylamine or dimethylformamide and the suspension is warmed for some time, with stirring. The reaction is advantageously carried out at a temperature between 45° and 80° C. As soon as the evolution of hydrochloric acid has subsided, the excess thionyl chloride is removed by distillation. 423 parts of the crude acid chloride 4-(β-chloroethylsulfonylmethyl)-benzoyl chloride with a melting point of 124° C. are obtained from the distillation residue. This acid chloride still contains about 3-7% of impurities. Because of the marked readiness of the benzoyl chloride group to react and the associated sensitivity to hydrolysis, this benzoyl chloride compound according to the invention cannot be further purified. However, analyses confirm its chemical structure. When recrystallized from toluene or chlorobenzene, it has a melting point of 132° to 135° C.

Analysis: C found 43.6%, calculated 43.2%. S found 11.0%, calculated 11.4%, Cl found 25.6%, calculated 25.3%.

In the crude product form which can be obtained as above, this new acid chloride can be employed as an acylating agent for primary or secondary amino groups of fiber-finishing compounds or precursors thereof, in order to introduce the fiber-reactive 4-(β-chloroethylsulfonyl)-methyl-benzoyl radical into this molecule containing amino groups.

EXAMPLE 2

The same reaction is carried out by the procedures described in Example 1 using 272 parts of 3-methyl-benzoic acid, to synthesize the acid chloride 3-(β-chloroethylsulfonyl)-methyl-benzoyl chloride. 300 parts of 3-(β-hydroxyethylsulfonyl)-methyl-benzoic acid with a melting point of 160° to 165° C. are obtained as the intermediate product; the crude 3-(β-chloroethylsulfonyl)-methyl-benzoyl chloride which can be obtained therefrom by means of thionyl chloride has a melting point of 50°–60° C. When recrystallized from toluene or chlorobenzene, this product has a melting point of 67° to 70° C.

Analysis: C found 43.7%, calculated 43.2%, S found 10.7%, calculated 11.4%, Cl found 25.8%, calculated 25.3%.

This acid chloride can also be used as an acylating agent in a manner analogous to that described for its isomeric compound in Example 1.

EXAMPLE 3

1,500 parts of methyl-p-toluate are chlorinated by passing in 329 parts of chlorine under UV irradiation and at a temperature between 95° and 100° C. The batch is then freed from hydrogen chloride gas and chlorine gas by passing through nitrogen. The crude chlorination mixture is then partially distilled under reduced pressure. A distillate of about 1,000 parts passes over up to a temperature of 140° to 144° C./12 to 27 mbar, which chiefly consists of starting material which can be used again in further chlorination batches as a mixture with pure methyl p-toluate.

646 parts of distillation residue consisting of methyl 4-chloromethyl-benzoate to the extent of 80% remain. This distillation residue is poured into a mixture of 1,570 parts of water, 315 parts of mercaptoethanol and 900 parts of a 33% strength aqueous sodium hydroxide solution. This reaction mixture is heated to the boiling point and is kept at this temperature for 30 minutes, at a pH value greater than 9. 14 parts of tungstic acid and 5,000 parts of ice are then added to the solution. 980 parts of aqueous 35% strength hydrogen superoxide are allowed to run in over a period of 15 minutes, with further stirring; during this addition, the temperature rises to 30° to 40° C. The mixture is warmed to the boiling point, with stirring, and stirring is continued until all the hydrogen superoxide has disappeared, which is the case after about 30 minutes. The reaction mixture is allowed to cool somewhat and 385 parts of 31% strength aqueous hydrochloric acid are then added. The reaction mixture is cooled to room temperature and the reaction product which has precipitated is filtered off and dried at 110° C. under reduced pressure.

825 parts of a colorless powder which consists of 4-(β-hydroxyethylsulfonylmethyl)-benzoic acid to the extent of 80% has a melting point of 205° to 210° C. are obtained. The product is converted into 4-(β-chloroethylsulfonylmethyl)-benzoyl chloride as described in Example 1; however, it can also be reacted in accordance with the procedure of Example 4 which follows.

EXAMPLE 3a

The procedure described in Example 3 is followed, but the methyl p-toluate is replaced by 1,500 parts of methyl m-toluate. 735 parts of 3-(β-hydroxyethylsulfonylmethyl)-benzoic acid with a purity of 85% and a melting point of 165° C. are obtained. This product can likewise be converted into 3-(β-chloroethylsulfonylmethyl)-benzoyl chloride by the procedure of Example 1 or of Example 4. In the pure form (when recrystallized from toluene or chlorobenzene), it has a melting point of 67° to 70° C.

EXAMPLE 4

537 parts of 4-(β-hydroxyethylsulfonylmethyl)-benzoic acid are introduced into a mixture of 1,000 parts of chlorobenzene and 5 parts of triethylamine; 670 parts of thionyl chloride are added and the reaction mixture is stirred at about 80° to 90° C. for 2 hours. Excess thionyl chloride is then removed under reduced pressure. The reaction mixture which remains consists of 562 parts of 4-(β-chloroethylsulfonylmethyl)-benzoyl chloride. It is liquid at 60° to 70° C. and can be used in the form in which it is obtained for acylating amino groups.

In the pure form, the product has a melting point of 132° to 135° C.

EXAMPLE 5a

A neutral solution of 75.2 parts of 1,3-diaminobenzene-4-sulfonic acid in 800 parts of water is prepared, 70 parts of crystalline sodium acetate are added and the mixture is cooled to 0° to 5° C. A solution of 124 parts of 4-(β-chloroethylsulfonyl-methyl)-benzoyl chloride (for example prepared according to the above Example 1) in 500 parts by volume of methylene chloride is allowed to run into this solution at 0° to 5° C. in the course of one hour, with good stirring. The suspension obtained is then adjusted to a pH value of 5 to 6 with sodium carbonate or sodium acetate, and stirring is continued for a further 5 to 6 hours at 8° to 10° C., the mixture is then filtered and the filter cake is dried at 70° to 80° C. under reduced pressure. 180 parts of an electrolyte-containing (NaCl) powder which has a content of the compound of the formula

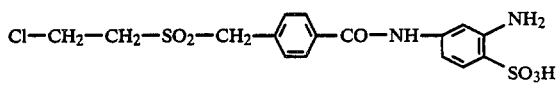

in the form of the sodium salt, of 72% are obtained. Isolation of this intermediate compound is as a rule not necessary for further processing of this acylation product to give, for example, dyestuffs, which also means that losses in yield are avoided.

EXAMPLE 5b

The procedure described in Example 4 is followed, but instead of 1,3-diaminobenzene-4-sulfonic acid, the same amount of the isomeric 1,4-diaminobenzene-2-sulfonic acid is employed. The compound of the formula (written in the form of the free acid)

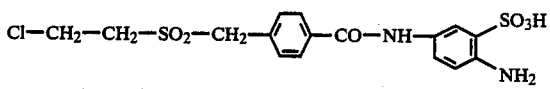

which can be used industrially as a fiber-reactive diazo component for the preparation of fiber-reactive azo compounds (dyestuffs), is obtained in the same yield.

EXAMPLE 5c

The procedure described in Example 4 is followed, but instead of 1,3-diaminobenzene-4-sulfonic acid, either 107 parts of 1,4-diaminobenzene-2,6-disulfonic acid or 80.8 parts of 2,4-diamino-toluene-5-sulfonic acid or 80.8 parts of 2,5-diamino-toluene-4-sulfonic acid or 80.8 parts of 2,4-diaminotoluene-6-sulfonic acid are employed as the aromatic amine in the acylation reaction. The aromatic amino compounds corresponding to the general formula

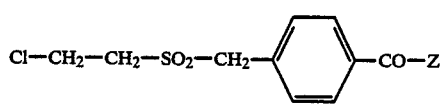

in which Z denotes a radical of the formula (a), (b), (c) or (d):

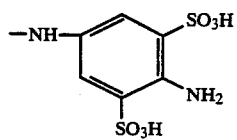 (a)

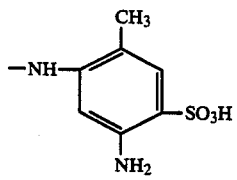 (b)

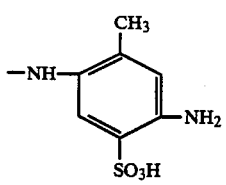 (c)

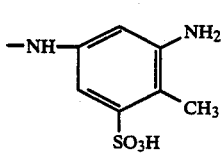 (d)

are obtained in a yield which is about equally as good. These compounds can be used as diazo components for the preparation of fiber-reactive azo compounds (dyestuffs). For further processing of these acylation products, prior isolation is as a rule not necessary; losses in yield are thereby avoided.

EXAMPLE 5d

A neutral aqueous solution, containing sodium acetate, of 75.2 parts of 1,3-diaminobenzene-4-sulfonic acid is prepared according to Example 4. A solution of 124 parts of 3-($\beta$-chloroethylsulfonyl-methyl)-benzoyl chloride in 100 parts of diglycol dimethyl ether is allowed to run in at a temperature of 20° to 50° C. in the course of one hour, with good stirring. The suspension which forms is then adjusted to a pH value of 5 to 6 with sodium carbonate or sodium acetate and is subsequently stirred for a further 5 to 6 hours. The product is filtered off and dried. An electrolyte-containing powder comprising the sodium salt of 3-[3'-($\beta$-chloroethylsulfonyl-methyl)-benzoylamino]-aniline-4-sulfonic acid is obtained. The yield is about 82% of theory.

EXAMPLE 5e 70 parts of crystalline sodium acetate are added to a neutral solution of 75.2 parts of 1,3-diaminobenzene-4-sulfonic acid in 800 parts of water and the mixture is cooled. A solution of 124 parts of 4-($\beta$-chloroethylsulfonylmethyl)-benzoyl chloride in chlorobenzene at 60° to 70° C. is now added in the course of one hour, with good stirring. The mixture is subsequently stirred at room temperature and at a pH value of 5 to 6 for several hours. The extent of completion of the reaction is examined by titration of the amino groups. At a conversion of 95% and over, the crude reaction mixture, which contains the acylation product of the formula from Example 5a, can be further processed in subsequent reactions, such as are described, for example, in the examples which follow.

EXAMPLE 6

43.3 parts of the acylamino compound from Example 5a are suspended in 600 parts of water; 20 parts by volume of aqueous 5N sodium nitrate solution are added. 35 parts of aqueous concentrated hydrochloric acid are allowed to run in at a temperature of 5° to 10° C., with stirring, and the diazotization is brought to completion in the course of 2 hours, with stirring. Excess nitrite is destroyed with amidosulfonic acid. 28.4 parts of 1-(4'-sulfo)-phenyl-5-pyrazolone-3-carboxylic acid are then added as the coupling component and the pH value is adjusted to 4 to 5 with sodium carbonate. When the coupling has ended, the solution is clarified, and the water-soluble azo compound formed is isolated from the filtrate in the customary manner, for example by evaporation, spray-drying or salting out. An electrolyte-containing brown powder which comprises the alkali metal salt of the compound of the formula

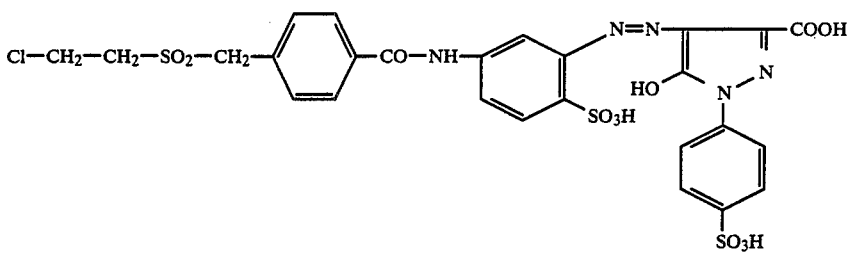

is obtained. This compound dissolves in water giving a yellow-colored solution, and is particularly suitable as a dyestuff. When used on polyamide fiber materials, wool and silk, but in particular on cellulose fibers, in the dyeing and printing processes customary for fiber-reactive dyestuffs, it gives brilliant yellow dyeings. It has a high rate of fixing and a high tinctorial strength, and a high affinity in the exhaustion process.

The dyeings and prints obtained with the compound have good to very good fastness properties, such as, for example, very good fastness to washing at 60° and 95° C., a good fastness to water (severe), fastness to boiling with sodium carbonate, fastness to washing with peroxide, fastness to acid and alkaline perspiration, fastness to chlorinated water, fastness to cross-dyeing, fastness to rubbing and fastness to waste gases and a very good fastness to light on moist and dry fabric. The prints are distinguished by their high sharpness of contour and the purity of the white ground. Non-fixed portions of the azo compound employed according to the invention as a dyestuff can easily be washed out. Dyeings and prints on cotton and viscose staple have the same shade and depth of colour when applied by the customary printing and dyeing processes. After-treatment of the dyes textiles, for example creaseproof finishing ("wash-and-wear" finishing), does not alter the shade of the dyeing.

EXAMPLE 7

A neutral solution of 31.9 parts of 1-amino-8-hydroxynaphthalene-3,6-sulfonic acid in 300 parts of water is prepared, 30 parts of crystalline sodium acetate are added and the mixture is cooled to 5° to 10° C. 31 parts of finely ground 4-($\beta$-chloroethylsulfonyl)-methylbenzoyl chloride are added in the course of 1 to 2 hours, with stirring, and stirring is then continued for several hours. A diazonium salt solution obtained from 14.1 parts of 2-sulfo-aniline are then allowed to run in, and the coupling reaction is carried out at a pH of 6 to 7. The coupling solution is then clarified and the azo compound prepared is isolated from the filtrate in the customary manner, for example by evaporation, spray-drying or salting out.

A dark red electrolyte-containing powder which comprises the alkali metal salt of the compound of the formula

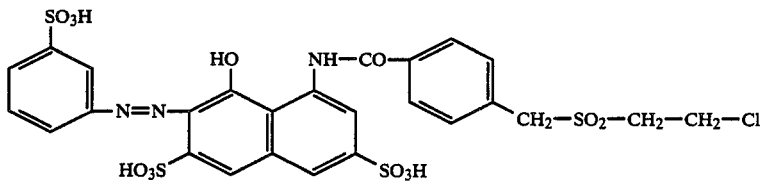

is obtained. This compound is particularly suitable for use as a dyestuff for dyeing polyamide fiber materials, wool and silk, but in particular for cellulose fiber materials, by the customary dyeing and printing processes for fiber-reactive dyestuffs. It gives dyeings and prints with a brilliant red shade and with the good fastness properties and dyeing properties described in Example 6.

EXAMPLE 8

237 parts of 6-nitro-1-diazo-2-naphthol-4-sulfonic acid, 256 parts of 1-amino-8-naphthol-2,4-disulfonic acid and 224 parts of calcium hydroxide are stirred in 1,200 parts of water and 1,600 parts of ice for 10 hours. The reaction mixture is then warmed to 60° C., 156 parts of sodium sulfide are added and the mixture is stirred for one hour. Excess sulfide is destroyed with 20 parts of 30% strength hydrogen peroxide. 1,200 parts by volume of 26% strength aqueous sulfuric acid are then added, the calcium sulfate which has precipitated is filtered off and the aminoazo compound thus prepared is isolated from the filtrate by salting out and filtration.

The moist filter cake is dissolved in 2,400 parts of water by means of about 240 parts of crystalline sodium acetate and 50 parts by volume of aqueous 33% strength sodium hydroxide solution, to give a neutral solution. 260 parts of 4-($\beta$-chloroethylsulfonylmethylene)-benzoyl chloride, in pulverulent form or as a hot solution at 50° to 60° C. in 200 parts by volume of diglycol dimethyl ether or methylglycol acetate, dioxane, chlorobenzene or chloroform, are then added at 0° to 5° C. in the course of one to two hours, and the reaction mixture is stirred for several hours.

This acylated azo compound thus obtained is then converted into the copper complex compound. For this conversion, 88 parts of basic copper carbonate are added to the solution and the reaction mixture is stirred at 60° to 70° C. for one hour and is then clarified by filtration. The copper complex azo compound is isolated by spray-drying. About 800 parts of a black, electrolyte-containing powder with a content of alkali metal salt of the compound of the formula

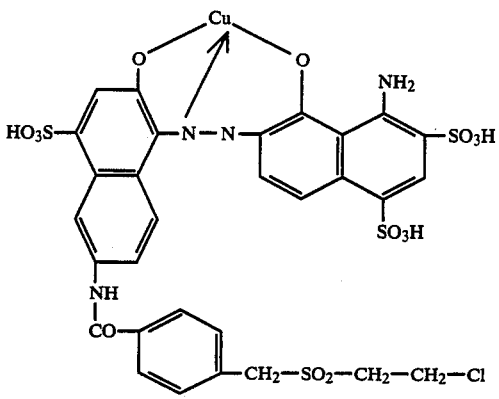

of about 67% are obtained. This copper complex compound is particularly suitable as a dyestuff in all the dyeing processes customary for fiber-reactive dyestuffs, and, on polyamide and cellulose fibers, gives deep, pure blue dyeings and prints with the advantageous fastness properties described in Example 6. In particular, by the methods of the exhaustion, padding and printing processes, it is already fixed onto cellulose fiber materials in the cold (15°-30° C.) in the presence of alkalis, and gives strong, level dyeings in these processes.

EXAMPLE 9

25.3 parts of aniline-2,5-disulfonic acid are diazotized and the diazotization product is coupled with 15.1 parts of 3-aminophenylurea in the acid range in the customary manner. When the coupling has ended, the pH value is adjusted to 7, 30 parts of crystalline sodium acetate are added and the solution is cooled to 5° to 10° C. 33.7 parts of pulverulent 4-(β-chloroethylsulfonyl)-methyl-benzoyl chloride are then added in the course of one hour, and the reaction mixture is stirred for several hours. It is clarified, and the azo compound formed is salted out with sodium chloride. After the precipitate has been filtered off and dried, 110 parts of an electrolyte-containing powder which has a content of the sodium salt of the compound of the formula

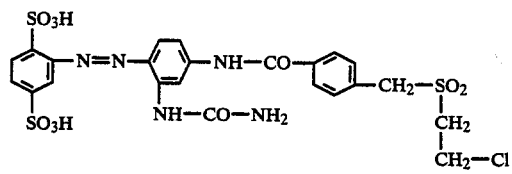

of 44% are obtained. When used on natural and synthetic polyamide fiber materials, but in particular on cellulose fiber materials, by the dyeing processes which are customary in the art for fiber-reactive dyestuffs, this compound gives golden yellow dyeings and prints with the good dyeing properties and fastness properties described in Example 6.

EXAMPLE 10

From 30.3 parts of 2-naphthylamine-1,5-disulfonic acid, as the diazo component, and 30.3 parts of 1-amino-8-naphthol-3,6-disulfonic acid, the corresponding azo compound is prepared in the customary manner in an aqueous medium which is acid to Congo Red. When the coupling has ended, the acylamino compound from Example 4, as the diazonium salt in the form of an aqueous solution which had been prepared by diazotization of 20 parts of this acylamino compound by means of aqueous 5N sodium nitrite solution, is added, as the second diazo component, to this coupling solution. This second coupling reaction is now carried out at a pH value of 5, with the addition of sodium carbonate. The reaction mixture is then warmed to 60° to 70° C. and clarified. The fiber-reactive disazo compound prepared is isolated by evaporation, spray-drying or salting out. A black electrolyte-containing powder which comprises the alkali metal salt of the compound of the formula

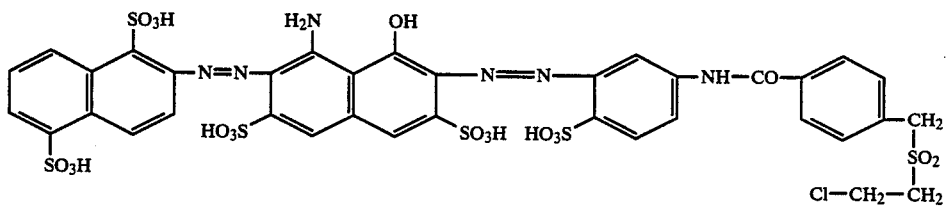

is obtained. This disazo compound is particularly suitable for dyeing polyamide and cellulose fiber materials by the dyeing procedures customary in the art for fiber-reactive dyestuffs, and, on these materials, gives greenish-tinged navy blue to black dyeings and prints with the good properties mentioned in Example 6.

EXAMPLES 11 TO 242

A procedure for the preparation of an azo compound corresponding to the general formula (1) or a heavy metal complex derivative thereof, is followed, according to the invention, for example in a varient analogous to a procedure described in one of the preceding Examples 6 to 10, and the starting compounds mentioned in the tabular examples which follow are employed as the diazo and coupling components, if necessary, with subsequent acylation of the aminoazo compound by a compound of the general formula (3) according to the invention and/or, if appropriate, subsequent conversion into the heavy metal complex compound by means of a heavy metal salt. The corresponding monoazo or disazo compounds according to the invention or their heavy metal complex derivatives are obtained; these products also have good technological properties and fastness properties and dye polyamide fiber materials or cellulose fiber materials in the shades given.

| Example | Diazo component | Coupling component | Color shade |
|---|---|---|---|
| 11 | 3-[4'-(β-chloroethylsulfonyl-methyl)-benzoylamino]-6- | 1-acetylamino-8-naphthol-3,6-disulfonic acid | bluish-tinged red |

-continued

| | | | |
|---|---|---|---|
| | sulfo-aniline | | |
| 12 | 3-[4'-(β-chloroethylsulfonyl-methyl)-benzoylamino]-6-sulfo-aniline | 1-acetylamino-8-naphthol-4-sulfonic acid | bluish-tinged red |
| 13 | 3-[4'-(β-chloroethylsulfonyl-methyl)-benzoylamino]-6-sulfo-aniline | 1-acetylamino-8-naphthol-4,6-disulfonic acid | bluish-tinged red |
| 14 | 3-[4'-(β-chloroethylsulfonyl-methyl)-benzoylamino]-6-sulfo-aniline | 1-acetylamino-8-naphthol-6-sulfonic acid | bluish-tinged red |
| 15 | 3-[4'-(β-chloroethylsulfonyl-methyl)-benzoylamino]-6-sulfo-aniline | 1-benzoylamino-8-naphthol-4,6-disulfonic acid | bluish-tinged red |
| 16 | 3-[4'-(β-chloroethylsulfonyl-methyl)-benzoylamino]-6-sulfo-aniline | 1-benzoylamino-8-naphthol-3,6-disulfonic acid | bluish-tinged red |
| 17 | 3-[4'-(β-chloroethylsulfonyl-methyl)-benzoylamino]-6-sulfo-aniline | 1-tosylamino-8-naphthol-3,6-disulfonic acid | bluish-tinged red |
| 18 | 3-[4'-(β-chloroethylsulfonyl-methyl)-benzoylamino]-6-sulfo-aniline | 1-propionylamino-8-naphthol-3,6-disulfonic acid | bluish-tinged red |
| 19 | 3-[4'-(β-chloroethylsulfonyl-methyl)-benzoylamino]-6-sulfo-aniline | 1-phenylureido-8-naphthol-3,6-disulfonic acid | bluish-tinged red |
| 20 | 3-[4'-(β-chloroethylsulfonyl-methyl)-benzoylamino]-6-sulfo-aniline | 1-phenylureido-8-naphthol-4,6-disulfonic acid | bluish-tinged red |
| 21 | 3-[4'-(β-chloroethylsulfonyl-methyl)-benzoylamino]-6-sulfo-aniline | 2-acetylamino-8-naphthol-6-sulfonic acid | reddish-tinged orange |
| 22 | 3-[4'-(β-chloroethylsulfonyl-methyl)-benzoylamino]-6-sulfo-aniline | 2-acetylamino-8-naphthol-3,6-disulfonic acid | red |
| 23 | 3-[4'-(β-chloroethylsulfonyl-methyl)-benzoylamino]-6-sulfo-aniline | 2-nicotinylamino-8-naphthol-6-sulfonic acid | reddish-tinged orange |
| 24 | 3-[4'-(β-chloroethylsulfonyl-methyl)-benzoylamino]-6-sulfo-aniline | 2-acetylamino-5-naphthol-7-sulfonic acid | orange |
| 25 | 3-[4'-(β-chloroethylsulfonyl-methyl)-benzoylamino]-6-sulfo-aniline | 2-acetylamino-5-naphthol-1,7-disulfonic acid | orange |
| 26 | 3-[4'-(β-chloroethylsulfonyl-methyl)-benzoylamino]-6-sulfo-aniline | 2-nicotinylamino-5-naphthol-7-sulfonic acid | orange |
| 27 | 3-[4'-(β-chloroethylsulfonyl-methyl)-benzoylamino]-6-sulfo-aniline | 2-propionylamino-8-naphthol-6-sulfonic acid | reddish-tinged orange |
| 28 | 3-[4'-(β-chloroethylsulfonyl-methyl)-benzoylamino]-6-sulfo-aniline | 2-propionylamino-5-naphthol-7-sulfonic acid | orange |
| 29 | 3-[4'-(β-chloroethylsulfonyl-methyl)-benzoylamino]-6-sulfo-aniline | 2-N—methylacetylamino-8-naphthol-6-sulfonic acid | reddish-tinged orange |
| 30 | 3-[4'-(β-chloroethylsulfonyl-methyl)-benzoylamino]-6-sulfo-aniline | 2-N—methylacetylamino-5-naphthol-7-sulfonic acid | orange |
| 31 | 3-[4'-(β-chloroethylsulfonyl-methyl)-benzoylamino]-6-sulfo-aniline | 1-naphthylamine-4-sulfonic acid | orange |
| 32 | 3-[4'-(β-chloroethylsulfonyl-methyl)-benzoylamino]-6-sulfo-aniline | 1-naphthylamine-5-sulfonic acid | orange |
| 33 | 3-[4'-(β-chloroethylsulfonyl-methyl)-benzoylamino]-6-sulfo-aniline | 2-naphthylamine-6-sulfonic acid | orange |
| 34 | 3-[4'-(β-chloroethylsulfonyl-methyl)-benzoylamino]-6-sulfo-aniline | 2-naphthylamine-3,6-disulfonic acid | orange |
| 35 | 3-[4'-(β-chloroethylsulfonyl-methyl)-benzoylamino]-6-sulfo-aniline | 2-naphthylamine-3,7-disulfonic acid | orange |
| 36 | 3-[4'-(β-chloroethylsulfonyl-methyl)-benzoylamino]-6-sulfo-aniline | 1-naphthol-3-sulfonic acid | orange |
| 37 | 3-[4'-(β-chloroethylsulfonyl-methyl)-benzoylamino]-6-sulfo-aniline | 1-naphthol-4-sulfonic acid | orange |
| 38 | 3-[4'-(β-chloroethylsulfonyl-methyl)-benzoylamino]-6-sulfo-aniline | 1-naphthol-5-sulfonic acid | red |

-continued

| | | | |
|---|---|---|---|
| 39 | 3-[4'-(β-chloroethylsulfonyl-methyl)-benzoylamino]-6-sulfo-aniline | 1-naphthol-3,6-disulfonic acid | orange |
| 40 | 3-[4'-(β-chloroethylsulfonyl-methyl)-benzoylamino]-6-sulfo-aniline | 1-naphthol-4,8-disulfonic acid | red |
| 41 | 3-[4'-(β-chloroethylsulfonyl-methyl)-benzoylamino]-6-sulfo-aniline | 1-naphthol-3,6,8-trisulfonic acid | red |
| 42 | 3-[4'-(β-chloroethylsulfonyl-methyl)-benzoylamino]-6-sulfo-aniline | 2-naphthol-6-sulfonic acid | orange |
| 43 | 3-[4'-(β-chloroethylsulfonyl-methyl)-benzoylamino]-6-sulfo-aniline | 2-naphthol-3,6-disulfonic acid | orange |
| 44 | 3-[4'-(β-chloroethylsulfonyl-methyl)-benzoylamino]-6-sulfo-aniline | 2-naphthol-6,8-disulfonic acid | orange |
| 45 | 3-[4'-(β-chloroethylsulfonyl-methyl)-benzoylamino]-6-sulfo-aniline | 1-[4'-(β-chloroethylsulfonylmethyl)-benzoylamino]-8-naphthol-3,6-disulfonic acid | bluish-tinged red |
| 46 | 3-[4'-(β-chloroethylsulfonyl-methyl)-benzoylamino]-6-sulfo-aniline | 1-(4'-sulfophenyl)-3-methyl-5-pyrazolone | yellow |
| 47 | 3-[4'-(β-chloroethylsulfonyl-methyl)-benzoylamino]-6-sulfo-aniline | 1-(4'-sulfophenyl)-3-carbomethoxy-5-pyrazolone | yellow |
| 48 | 3-[4'-(β-chloroethylsulfonyl-methyl)-benzoylamino]-6-sulfo-aniline | 1-(2'-chloro-5'-sulfo-phenyl)-3-methyl-5-pyrazolone | yellow |
| 49 | 3-[4'-(β-chloroethylsulfonyl-methyl)-benzoylamino]-6-sulfo-aniline | 1-(2',5'-disulfophenyl)-3-methyl-5-pyrazolone | yellow |
| 50 | 3-[4'-(β-chloroethylsulfonyl-methyl)-benzoylamino]-6-sulfo-aniline | 1-(4',8'-disulfo-2'-naphthyl)-3-methyl-5-pyrazolone | yellow |
| 51 | 3-[4'-(β-chloroethylsulfonyl-methyl)-benzoylamino]-6-sulfo-aniline | 1-(4'-sulfophenyl)-3-methyl-5-aminopyrazole | yellow |
| 52 | 3-[4'-(β-chloroethylsulfonyl-methyl)-benzoylamino]-6-sulfo-aniline | N—ethyl-N—(3'-sulfobenzyl)-aniline | orange |
| 53 | 3-[4'-(β-chloroethylsulfonyl-methyl)-benzoylamino]-6-sulfo-aniline | N,N—bis-(β-hydroxyethyl)-aniline | orange |
| 54 | 3-[4'-(β-chloroethylsulfonyl-methyl)-benzoylamino]-6-sulfo-aniline | N,N—bis-(β-sulfatoethyl)-aniline | orange |
| 55 | 3-[4'-(β-chloroethylsulfonyl-methyl)-benzoylamino]-6-sulfo-aniline | N—ethyl-N—(β-sulfatoethyl)-aniline | orange |
| 56 | 3-[4'-(β-chloroethylsulfonyl-methyl)-benzoylamino]-6-sulfo-aniline | resorcinol | orange |
| 57 | 3-[4'-(β-chloroethylsulfonyl-methyl)-benzoylamino]-6-sulfo-aniline | resorcinol-sulfonic acid | orange |
| 58 | 3-[4'-(β-chloroethylsulfonyl-methyl)-benzoylamino]-6-sulfo-aniline | 1,4-dimethyl-2-hydroxy-5-sulfo-6-pyridone | yellow |
| 59 | 3-[4'-(β-chloroethylsulfonyl-methyl)-benzoylamino]-6-sulfo-aniline | 2-hydroxy-4-methyl-5-sulfo-6-pyridone | yellow |
| 60 | 3-[4'-(β-chloroethylsulfonyl-methyl)-benzoylamino]-6-sulfo-aniline | 2-amino-8-naphthol-6-sulfonic acid (coupled under acid conditions) | red |
| 61 | 3-[4'-(β-chloroethylsulfonyl-methyl)-benzoylamino]-6-sulfo-aniline | 1-amino-8-naphthol-2,4-disulfonic acid | bluish-tinged red |
| 62 | 3-[4'-(β-chloroethylsulfonyl-methyl)-benzoylamino]-6-sulfo-aniline | acetoacetaniline-3-sulfonic acid | yellow |
| 63 | 3-[4'-(β-chloroethylsulfonyl-methyl)-benzoylamino]-6-sulfo-aniline | 8-hydroxyquinoline-5-sulfonic acid | orange |
| 64 | 3-[4'-(β-chloroethylsulfonyl-methyl)-benzoylamino]-6-sulfo-aniline | diphenylamine-4-sulfonic acid | orange |
| 65 | 3-[4'-(β-chloroethylsulfonyl-methyl)-benzoylamino]-6-sulfo-aniline | 1-phenylamino-naphthalene-8-sulfonic acid | claret |
| 66 | 4-[4'-(β-chloroethylsulfonyl- | 1-acetylamino-8-naphthol-3,6- | reddish- |

| | | -continued | |
|---|---|---|---|
| | methyl)-benzoylamino]-2-sulfo-aniline | disulfonic acid | tinged violet |
| 67 | 4-[4'-(β-chloroethylsulfonyl-methyl)-benzoylamino]-2-sulfo-aniline | 1-naphthol-3,6-disulfonic acid | red |
| 68 | 4-[4'-(β-chloroethylsulfonyl-methyl)-benzoylamino]-2-sulfo-aniline | 1-(4'-sulfophenyl)-3-carboxy-5-pyrazolone | reddish-tinged yellow |
| 69 | 4-[4'-(β-chloroethylsulfonyl-methyl)-benzoylamino]-2-sulfo-aniline | 2-acetylamino-8-naphthol-6-sulfonic acid | bluish-tinged red |
| 70 | 4-[4'-(β-chloroethylsulfonyl-methyl)-benzoylamino]-2-sulfo-aniline | 2-naphthylamine-3,6-disulfonic acid | red |
| 71 | 4-[4'-(β-chloroethylsulfonyl-methyl)-benzoylamino]-2-sulfo-aniline | 2-amino-8-naphthol-6-sulfonic acid | bluish-tinged red |
| 72 | 4-[4'-(β-chloroethylsulfonyl-methyl)-benzoylamino]-2,6-disulfo-aniline | 2-acetylamino-5-naphthol-7-sulfonic acid | orange |
| 73 | 4-[4'-(β-chloroethylsulfonyl-methyl)-benzoylamino]-2,6-disulfo-aniline | 1-(4'-sulfophenyl)-3-methyl-5-pyrazolone | reddish-tinged yellow |
| 74 | 4-[4'-(β-chloroethylsulfonyl-methyl)-benzoylamino]-2,6-disulfo-aniline | 1-naphthol-4-sulfonic acid | red |
| 75 | 3-[4'-(β-chloroethylsulfonyl-methyl)-benzoylamino]-4-methyl-6-sulfo-aniline | 1-acetylamino-3,6-disulfo-8-naphthol | bluish-tinged red |
| 76 | 3-[4'-(β-chloroethylsulfonyl-methyl)-benzoylamino]-4-methyl-6-sulfo-aniline | 3,6-disulfo-1-naphthol | orange |
| 77 | 3-[4'-(β-chloroethylsulfonyl-methyl)-benzoylamino]-4-methyl-6-sulfo-aniline | 1-(4'-sulfophenyl)-3-carbomethoxy-5-pyrazolone | reddish-tinged yellow |
| 78 | 3-[4'-(β-chloroethylsulfonyl-methyl)-benzoylamino]-4-methyl-6-sulfo-aniline | 3,6-disulfo-2-naphthylamine | orange |
| 79 | 4-[4'-(β-chloroethylsulfonyl-methyl)-benzoylamino]-5-methyl-2-sulfo-aniline | 3,8-disulfo-1-naphthol | red |
| 80 | 4-[4'-(β-chloroethylsulfonyl-methyl)-benzoylamino]-5-methyl-2-sulfo-aniline | 3,7-disulfo-2-naphthylamine | reddish-tinged orange |
| 81 | 4-[4'-(β-chloroethylsulfonyl-methyl)-benzoylamino]-5-methyl-2-sulfo-aniline | 1-acetylamino-3,6-disulfo-8-naphthol | reddish-tinged violet |
| 82 | 3-[2'-(β-chloroethylsulfonyl-methyl)-benzoylamino]-6-sulfo-aniline | 1-acetylamino-4,6-disulfo-8-naphthol | bluish-tinged red |
| 83 | 3-[2'-(β-chloroethylsulfonyl-methyl)-benzoylamino]-6-sulfo-aniline | 3,6-disulfo-1-naphthol | orange |
| 84 | 3-[2'-(β-chloroethylsulfonyl-methyl)-benzoylamino]-6-sulfo-aniline | 1-(4'-sulfophenyl)-3-carboxy-5-pyrazolone | reddish-tinged yellow |
| 85 | 3-[2'-(β-chloroethylsulfonyl-methyl)-benzoylamino]-6-sulfo-aniline | 2-amino-6-sulfo-8-naphthol | red |
| 86 | 3-[3'-(β-chloroethylsulfonyl-methyl)-benzoylamino]-6-sulfo-aniline | 1-acetylamino-3,6-disulfo-8-naphthol | bluish-tinged red |
| 87 | 3-[3'-(β-chloroethylsulfonyl-methyl)-benzoylamino]-6-sulfo-aniline | 2-acetylamino-6-sulfo-8-naphthol | reddish-tinged orange |
| 88 | 3-[3'-(β-chloroethylsulfonyl-methyl)-benzoylamino]-6-sulfo-aniline | 3,6-disulfo-2-naphthylamine | orange |
| 89 | 3-[3'-(β-chloroethylsulfonyl-methyl)-benzoylamino]-6-sulfo-aniline | 1-(4'-sulfophenyl)-3-carboxy-5-pyrazolone | reddish-tinged yellow |
| 90 | 3-[3'-(β-chloroethylsulfonyl-methyl)-benzoylamino]-6-sulfo-aniline | 2-amino-6-sulfo-8-naphthol | red |
| 91 | 4-[3'-(β-chloroethylsulfonyl-methyl)-benzoylamino]-2-sulfo-aniline | 1-phenylureido-3,6-disulfo-8-naphthol | reddish-tinged violet |
| 92 | 4-[3'-(β-chloroethylsulfonyl-methyl)-benzoylamino]-2-sulfo-aniline | 3,6-disulfo-1-naphthol | red |
| 93 | 4-[3'-(β-chloroethylsulfonyl-methyl)-benzoylamino]-2- | 3,6-disulfo-2-naphthylamine | reddish-tinged orange |

-continued

| | | | |
|---|---|---|---|
| 94 | sulfo-aniline 4-[3'-(β-chloroethylsulfonyl-methyl)-benzoylamino]-2-sulfo-aniline | 1-(4'-sulfophenyl)-3-methyl-5-pyrazolone | reddish-tinged yellow |
| 95 | 4-[3'-(β-chloroethylsulfonyl-methyl)-benzoylamino]-2-sulfo-aniline | 2-amino-6-sulfo-8-naphthol | bluish-tinged red |
| 96 | sulfanilic acid | 1-[4'-(β-chloroethylsulfonylmethyl)-benzoylamino]-3,6-disulfo-8-naphthol | red |
| 97 | anthranilic acid | 1-[4'-(β-chloroethylsulfonylmethyl)-benzoylamino]-3,6-disulfo-8-naphthol | red |
| 98 | 2,4-disulfo-aniline | 1-[4'-(β-chloroethylsulfonylmethyl)-benzoylamino]-3,6-disulfo-8-naphthol | red |
| 99 | 2,5-disulfo-aniline | 1-[4'-(β-chloroethylsulfonylmethyl)-benzoylamino]-3,6-disulfo-8-naphthol | red |
| 100 | 3-sulfo-aniline | 1-[4'-(β-chloroethylsulfonylmethyl)-benzoylamino]-3,6-disulfo-8-naphthol | red |
| 101 | 3-acetylamino-6-sulfo-aniline | 1-[4'-(β-chloroethylsulfonylmethyl)-benzoylamino]-3,6-disulfo-8-naphthol | bluish-tinged red |
| 102 | 4-acetylamino-6-sulfo-aniline | 1-[4'-(β-chloroethylsulfonylmethyl)-benzoylamino]-3,6-disulfo-8-naphthol | reddish-tinged violet |
| 103 | 4-acetylamino-2,6-disulfo-aniline | 1-[4'-(β-chloroethylsulfonylmethyl)-benzoylamino]-3,6-disulfo-8-naphthol | reddish-tinged violet |
| 104 | 2-methoxyaniline-4-sulfonic acid | 1-[4'-(β-chloroethylsulfonylmethyl)-benzoylamino]-3,6-disulfo-8-naphthol | bluish-tinged red |
| 105 | 2-methoxyaniline-5-sulfonic acid | 1-[4'-(β-chloroethylsulfonylmethyl)-benzoylamino]-3,6-disulfo-8-naphthol | bluish-tinged red |
| 106 | 2,5-dichloroaniline-4-sulfonic acid | 1-[4'-(β-chloroethylsulfonylmethyl)-benzoylamino]-3,6-disulfo-8-naphthol | bluish-tinged red |
| 107 | 2,4-dichloroaniline-5-sulfonic acid | 1-[4'-(β-chloroethylsulfonyl-methyl)-benzoylamino]-3,6-disulfo-8-naphthol | bluish-tinged red |
| 108 | 2-methoxy-5-methyl-4-sulfo-aniline | 1-[4'-(β-chloroethylsulfonyl-methyl)-benzoylamino]-3,6-disulfo-8-naphthol | bluish-tinged red |
| 109 | 4-chloro-2-sulfo-aniline | 1-[4'-(β-chloroethylsulfonyl-methyl)-benzoylamino]-3,6-disulfo-8-naphthol | red |
| 110 | 4-methyl-2-sulfo-aniline | 1-[4'-(β-chloroethylsulfonyl-methyl)-benzoylamino]-3,6-disulfo-8-naphthol | red |
| 111 | 4-sulfo-1-naphthylamine | 1-[4'-(β-chloroethylsulfonyl-methyl)-benzoylamino]-3,6-disulfo-8-naphthol | violet |
| 112 | 1-sulfo-2-naphthylamine | 1-[4'-(β-chloroethylsulfonyl-methyl)-benzoylamino]-3,6-disulfo-8-naphthol | bluish-tinged red |
| 113 | 6-sulfo-2-naphthylamine | 1-[4'-(β-chloroethylsulfonyl-methyl)-benzoylamino]-3,6-disulfo-8-naphthol | bluish-tinged red |
| 114 | 1,5-disulfo-2-naphthylamine | 1-[4'-(β-chloroethylsulfonyl-methyl)-benzoylamino]-3,6-disulfo-8-naphthol | bluish-tinged red |
| 115 | 6,8-disulfo-2-naphthylamine | 1-[4'-(β-chloroethylsulfonyl-methyl)-benzoylamino]-3,6-disulfo-8-naphthol | violet |
| 116 | 3,6-disulfo-2-naphthylamine | 1-[4'-(β-chloroethylsulfonyl-methyl)-benzoylamino]-3,6-disulfo-8-naphthol | bluish-tinged red |
| 117 | 5,7-disulfo-2-naphthylamine | 1-[4'-(β-chloroethylsulfonyl-methyl)-benzoylamino]-3,6-disulfo-8-naphthol | bluish-tinged red |
| 118 | 3,6,8-trisulfo-2-naphthylamine | 1-[4'-(β-chloroethylsulfonyl-methyl)-benzoylamino]-3,6-disulfo-8-naphthol | violet |
| 119 | 2-sulfo-4-amino-diphenylamine | 1-[4'-(β-chloroethylsulfonyl-methyl)-benzoylamino]-3,6-disulfo-8-naphthol | reddish-tinged blue |
| 120 | 2-sulfo-4-amino-4'-methoxy-diphenylamine | 1-[4'-(β-chloroethylsulfonyl-methyl)-benzoylamino]-3,6-disulfo-8-naphthol | reddish-tinged blue |
| 121 | 2-sulfo-4-amino-2'-methoxy-diphenylamine | 1-[4'-(β-chloroethylsulfonyl-methyl)-benzoylamino]-3,6-disulfo-8-naphthol | reddish-tinged blue |
| 122 | 4-sulfo-6-chloro-3-amino-toluene | 1-[4'-(β-chloroethylsulfonyl-methyl)-benzoylamino]-3,6-disulfo-8-naphthol | red |
| 123 | 2-chloro-aniline | 1-[4'-(β-chloroethylsulfonyl-methyl)-benzoylamino]-3,6-disulfo-8-naphthol | red |
| 124 | 4-chloro-aniline | 1-[4'-(β-chloroethylsulfonyl-methyl)-benzoylamino]-3,6- | red |

| | | | |
|---|---|---|---|
| 125 | 4-methoxy-aniline | 1-[4'-(β-chloroethylsulfonyl-methyl)-benzoylamino]-3,6-disulfo-8-naphthol | bluish-tinged red |
| 126 | 4-toluidine | 1-[4'-(β-chloroethylsulfonyl-methyl)-benzoylamino]-3,6-disulfo-8-naphthol | bluish-tinged red |
| 127 | 4-sulfo-2-aminophenol | 1-[4'-(β-chloroethylsulfonyl-methyl)-benzoylamino]-3,6-disulfo-8-naphthol | violet (copper complex) |
| 128 | 5-sulfo-2-aminophenol | 1-[4'-(β-chloroethylsulfonyl-methyl)-benzoylamino]-3,6-disulfo-8-naphthol | violet (Cu complex) |
| 129 | orthanilic acid | 1-[4'-(β-chloroethylsulfonyl-methyl)-benzoylamino]-4,6-disulfo-8-naphthol | red |
| 130 | sulfanilic acid | 1-[4'-(β-chloroethylsulfonyl-methyl)-benzoylamino]-4,6-disulfo-8-naphthol | red |
| 131 | 2,5-disulfo-aniline | 1-[4'-(β-chloroethylsulfonyl-methyl)-benzoylamino]-4,6-disulfo-8-naphthol | red |
| 132 | 3-acetylamino-6-sulfo-aniline | 1-[4'-(β-chloroethylsulfonyl-methyl)-benzoylamino]-4,6-disulfo-8-naphthol | bluish-tinged red |
| 133 | 2-methoxy-5-sulfo-aniline | 1-[4'-(β-chloroethylsulfonyl-methyl)-benzoylamino]-4,6-disulfo-8-naphthol | bluish-tinged red |
| 134 | 2,5-dimethoxy-4-sulfo-aniline | 1-[4'-(β-chloroethylsulfonyl-methyl)-benzoylamino]-4,6-disulfo-8-naphthol | reddish-tinged violet |
| 135 | 2-methoxy-5-methyl-4-sulfo-aniline | 1-[4'-(β-chloroethylsulfonyl-methyl)-benzoylamino]-4,6-disulfo-8-naphthol | bluish-tinged red |
| 136 | 2-methoxy-5-chloro-4-sulfo-aniline | 1-[4'-(β-chloroethylsulfonyl-methyl)-benzoylamino]-4,6-disulfo-8-naphthol | bluish-tinged red |
| 137 | 5-sulfo-1-naphthylamine | 1-[4'-(β-chloroethylsulfonyl-methyl)-benzoylamino]-4,6-disulfo-8-naphthol | violet |
| 138 | 1-sulfo-2-naphthylamine | 1-[4'-(β-chloroethylsulfonyl-methyl)-benzoylamino]-4,6-disulfo-8-naphthol | bluish-tinged red |
| 139 | 1,5-disulfo-2-naphthylamine | 1-[4'-(β-chloroethylsulfonyl-methyl)-benzoylamino]-4,6-disulfo-8-naphthol | bluish-tinged red |
| 140 | 6-sulfo-2-naphthylamine | 1-[4'-(β-chloroethylsulfonyl-methyl)-benzoylamino]-4,6-disulfo-8-naphthol | bluish-tinged red |
| 141 | 4,8-disulfo-2-naphthylamine | 1-[4'-(β-chloroethylsulfonyl-methyl)-benzoylamino]-4,6-disulfo-8-naphthol | reddish-tinged violet |
| 142 | 3,6,8-trisulfo-2-naphthylamine | 1-[4'-(β-chloroethylsulfonyl-methyl)-benzoylamino]-4,6-disulfo-8-naphthol | reddish-tinged violet |
| 143 | 2-sulfo-4-amino-4'-methoxy-diphenylamine | 1-[4'-(β-chloroethylsulfonyl-methyl)-benzoylamino]-4,6-disulfo-8-naphthol | reddish-tinged blue |
| 144 | 4-sulfo-6-chloro-3-aminotoluene | 1-[4'-(β-chloroethylsulfonyl-methyl)-benzoylamino]-4,6-disulfo-8-naphthol | bluish-tinged red |
| 145 | 4-[4'-(β-chloroethylsulfonyl-methylene)-benzoylamino]-2-sulfo-aniline | 1-[4'-(β-chloroethylsulfonyl-methyl)-benzoylamino]-4,6-disulfo-8-naphthol | reddish-tinged violet |
| 146 | 3-[4'-(β-chloroethylsulfonyl-methyl)-benzoylamino]-6-sulfo-aniline | 1-[4'-(β-chloroethylsulfonyl-methyl)-benzoylamino]-4,6-disulfo-8-naphthol | bluish-tinged red |
| 147 | sulfanilic acid | 2-[4'-(β-chloroethylsulfonyl-methyl)-benzoylamino]-6-sulfo-8-naphthol | orange |
| 148 | orthanilic acid | 2-[4'-(β-chloroethylsulfonyl-methyl)-benzoylamino]-6-sulfo-8-naphthol | orange |
| 149 | 2,4-disulfoaniline | 2-[4'-(β-chloroethylsulfonyl-methyl)-benzoylamino]-6-sulfo-8-naphthol | orange |
| 150 | 5-sulfo-2-methoxy-aniline | 2-[4'-(β-chloroethylsulfonyl-methyl)-benzoylamino]-6-sulfo-8-naphthol | red |
| 151 | 4,8-disulfo-2-naphthylamine | 2-[4'-(β-chloroethylsulfonyl-methyl)-benzoylamino]-6-sulfo-8-naphthol | red |

-continued

| | | | |
|---|---|---|---|
| 152 | 4-[4'-(β-chloroethylsulfonyl-methyl)-benzoylamino]-2,6-disulfo-aniline | 2-[4'-(β-chloroethylsulfonyl-methyl)-benzoylamino]-6-sulfo-8-naphthol | bluish-tinged red |
| 153 | sulfanilic acid | 2-[4'-(β-chloroethylsulfonyl-methyl)-benzoylamino]-7-sulfo-5-naphthol | yellow |
| 154 | 4-sulfo-2,5-dimethoxy-aniline | 2-[4'-(β-chloroethylsulfonyl-methyl)-benzoylamino]-7-sulfo-5-naphthol | red |
| 155 | 1,5-disulfo-2-naphthylamine | 2-[4'-(β-chloroethylsulfonyl-methyl)-benzoylamino]-7-sulfo-5-naphthol | orange |
| 156 | 4-[3'-(β-chloroethylsulfonyl-methyl)-benzoylamino]-2,6-disulfo-aniline | 2-[4'-(β-chloroethylsulfonyl-methyl)-benzoylamino]-7-sulfo-5-naphthol | red |
| 157 | orthanilic acid | 1-[3'-(β-chloroethylsulfonyl-methyl)-benzoylamino]-3,6-disulfo-8-naphthol | red |
| 158 | 1,5-disulfo-2-naphthylamine | 1-[3'-(β-chloroethylsulfonyl-methyl)-benzoylamino]-3,6-disulfo-8-naphthol | bluish-tinged red |
| 159 | 4-sulfo-2,5-dimethoxy-aniline | 1-[3'-(β-chloroethylsulfonyl-methyl)-benzoylamino]-3,6-disulfo-8-naphthol | bluish-tinged red |
| 160 | 4-sulfo-2,5-dimethoxy-aniline | 1-[3'-(β-chloroethylsulfonyl-methyl)-benzoylamino]-4,6-disulfo-8-naphthol | bluish-tinged red |
| 161 | 4,8-disulfo-2-naphthylamine | 1-[3'-(β-chloroethylsulfonyl-methyl)-benzoylamino]-4,6-disulfo-8-naphthol | bluish-tinged red |
| 162 | 2-sulfo-4-amino-4'-methoxy-diphenylamine | 1-[3'-(β-chloroethylsulfonyl-methyl)-benzoylamino]-4,6-disulfo-8-naphthol | blue |
| 163 | 2,4-disulfo-aniline | 2-[3'-(β-chloroethylsulfonyl-methyl)-benzoylamino]-6-sulfo-8-naphthol | orange |
| 164 | 1,5-disulfo-2-naphthylamine | 2-[3'-(β-chloroethylsulfonyl-methyl)-benzoylamino]-6-sulfo-8-naphthol | red |
| 165 | 1,5-disulfo-2-naphthylamine | 2-[3'-(β-chloroethylsulfonyl-methyl)-benzoylamino]-7-sulfo-5-naphthol | orange |
| 166 | 4-sulfo-2-methoxy-aniline | 2-[3'-(β-chloroethylsulfonyl-methyl)-benzoylamino]-7-sulfo-5-naphthol | scarlet |
| 167 | 3-[3'-(β-chloroethylsulfonyl-methyl)-benzoylamino]-6-sulfoaniline | 2-[3'-(β-chloroethylsulfonyl-methyl)-benzoylamino]-7-sulfo-5-naphthol | red |

Metal complex monoazo compounds (for example analogous to Example 8) with:

Copper complex compounds:

| | | | |
|---|---|---|---|
| 168 | 6-[3'-(β-chloroethylsulfonyl-methyl)-benzoylamino]-4-sulfo-1-amino-2-naphthol | 1-amino-2,4-disulfo-8-naphthol | pure blue |
| 169 | 6-[4'-(β-chloroethylsulfonyl-methyl)-benzoylamino]-4-sulfo-1-amino-2-naphthol | 1-acetylamino-4,6-disulfo-8-naphthol | navy blue |
| 170 | 6-[4'-(β-chloroethylsulfonyl-methyl)-benzoylamino]-4,8-disulfo-2-amino-1-naphthol | 1-acetylamino-3,6-disulfo-8-naphthol | navy blue |
| 171 | 6-[4'-(β-chloroethylsulfonyl-methyl)-benzoylamino]-4-sulfo-2-aminophenol | 1-(2',5'-disulfophenyl)-3-methyl-5-pyrazolone | yellow-brown |
| 172 | 4-[4'-(β-chloroethylsulfonyl-methyl)-benzoylamino]-2-sulfo-aniline (with oxidative coppering) | 1-naphthol-3,6-disulfonic acid | violet |
| 173 | 4-[4'-(β-chloroethylsulfonyl-methyl)-benzoylamino]-2-sulfo-aniline (with oxidative coppering) | 3,6-disulfo-2-naphthol | violet |
| 174 | 4-sulfo-2-methoxy-aniline (with dealkylating coppering) | 1-[4'-(β-chloroethylsulfonyl-methyl)-benzoylamino]-3,6-disulfo-8-naphthol | violet |
| 175 | 5-sulfo-2-methoxy-aniline (dealkylating) | 1-[4'-(β-chloroethylsulfonyl-methyl)-benzoylamino]-3,6-disulfo-8-naphthol | violet |
| 176 | 4-sulfo-2,5-dimethoxy-aniline (dealkylating) | 1-[4'-(β-chloroethylsulfonyl-methyl)-benzoylamino]-3,6-disulfo-8-naphthol | reddish-tinged blue |
| 177 | 4-sulfo-2-methoxy-5-chloro-aniline (dealkylating) | 1-[4'-(β-chloroethylsulfonyl-methyl)-benzoylamino]-3,6-disulfo-8-naphthol | reddish-tinged blue |

-continued

| | | | |
|---|---|---|---|
| 178 | 6-sulfo-2-naphthylamine (oxidizing) | 1-[4'-(β-chloroethylsulfonyl-methyl)-benzoylamino]-3,6-disulfo-8-naphthol | bluish-tinged violet |
| 179 | 4,8-disulfo-2-naphthylamine (oxidizing) | 1-[4'-(β-chloroethylsulfonyl-methyl)-benzoylamino]-3,6-disulfo-8-naphthol | reddish-tinged blue |
| 180 | 4-sulfo-6-nitro-1-amino-2-naphthol | 1-[4'-(β-chloroethylsulfonyl-methyl)-benzoylamino]-3,6-disulfo-8-naphthol | blue |
| 181 | 4-sulfo-2-methoxy-5-methyl-aniline (dealkylating) | 1-[4'-(β-chloroethylsulfonyl-methyl)-benzoylamino]-4,6-disulfo-8-naphthol | violet |
| 182 | 4-sulfo-2-methoxy-5-chloro-aniline (dealkylating) | 1-[4'-(β-chloroethylsulfonyl-methyl)-benzoylamino]-4,6-disulfo-8-naphthol | violet |
| 183 | 6-sulfo-2-naphthylamine (oxidizing) | 1-[4'-(β-chloroethylsulfonyl-methyl)-benzoylamino]-4,6-disulfo-8-naphthol | violet |
| 184 | 4-sulfo-2-aminophenol | 1-[4'-(β-chloroethylsulfonyl-methyl)-benzoylamino]-4,6-disulfo-8-naphthol | violet |
| 185 | 5-sulfo-2-aminophenol | 1-[4'-(β-chloroethylsulfonyl-methyl)-benzoylamino]-4,6-disulfo-8-naphthol | violet |
| 186 | 4,8-disulfo-6-nitro-2-amino-naphthalene (oxidizing) | 1-[4'-(β-chloroethylsulfonyl-methyl)-benzoylamino]-4,6-disulfo-8-naphthol | blue |
| 187 | 4,8-disulfo-2-naphthylamine (oxidizing) | 2-[4'-(β-chloroethylsulfonyl-methyl)-benzoylamino]-6-sulfo-8-naphthol | violet |
| 188 | 4-sulfo-2,5-dimethoxy-aniline (dealkylating) | 2-[4'-(β-chloroethylsulfonyl-methyl)-benzoylamino]-6-sulfo-8-naphthol | violet |
| 189 | 5-sulfo-2-aminophenol | 2-[4'-(β-chloroethylsulfonyl-methyl)-benzoylamino]-6-sulfo-8-naphthol | violet |
| 190 | 4-sulfo-2,5-dimethoxyaniline (dealkylating) | 2-[4'-(β-chloroethylsulfonyl-methyl)-benzoylamino]-7-sulfo-5-naphthol | violet |
| 191 | 4,8-disulfo-2-naphthylamine (oxidizing) | 2-[4'-(β-chloroethylsulfonyl-methyl)-benzoylamino]-7-sulfo-5-naphthol | violet |
| 192 | 4-sulfo-2,5-dimethoxy-aniline (dealkylating) | 1-[3'-(β-chloroethylsulfonyl-methyl)-benzoylamino]-3,6-disulfo-8-naphthol | blue |
| 193 | 4-sulfo-2,5-dimethoxy-aniline (dealkylating) | 1-[3'-(β-chloroethylsulfonyl-methyl)-benzoylamino]-4,6-disulfo-8-naphthol | reddish-tinged blue |
| 194 | 4,8-disulfo-2-naphthylamine (oxidizing) | 1-[3'-(β-chloroethylsulfonyl-methyl)-benzoylamino]-4,6-disulfo-8-naphthol | violet |
| 195 | 5-sulfo-aminophenol | 2-[3'-(β-chloroethylsulfonyl-methyl)-benzoylamino]-6-sulfo-8-naphthol | violet |
| Chromium complex compounds: | | | |
| 196 | 3-[4'-(β-chloroethylsulfonyl-methyl)-benzoylamino]-6-sulfo-aniline | salicylic acid | yellow |
| 197 | 3-[4'-(β-chloroethylsulfonyl-methyl)-benzoylamino]-6-sulfo-aniline | anthranilic acid | yellow |

| Example | Diazo component | Coupling component | Acylating agent | Color shade |
|---|---|---|---|---|
| | Monoazo compounds (analogous to Example 9) with: | | | |
| 198 | 3,6,8-trisulfo-2-naphthylamine | 3-amino-phenylurea | 4-(β-chloroethyl-sulfonyl-methyl)-benzoyl chloride | yellowish-tinged orange |
| 199 | 3,6,8-trisulfo-2-naphthylamine | 3-amino-phenylurea | 3-(β-chloroethyl-sulfonyl-methyl)-benzoyl chloride | yellowish-tinged orange |
| 200 | 4,8-disulfo-2-naphthylamine | 3-methylaniline | 3-(β-chloroethyl-sulfonyl-methyl)-benzoyl chloride | reddish-tinged yellow |
| 201 | 2,4-disulfo-aniline | 2-methoxy-5-acetyl-amino-aniline | 4-(β-chloroethyl-sulfonyl-methyl)-benzoyl chloride | yellowish-tinged orange |
| 202 | 1,5-disulfo-2-naphthylamine | 1-aminonaphthalene-6,7-sulfonic acid | 4-(β-chloroethyl-sulfonyl-methyl)-benzoyl chloride | orange |
| 203 | 2,4-disulfo-aniline | 3-aminophenylurea | 4-(β-chloroethyl-sulfonyl-methyl)-benzoyl chloride | golden yellow |
| 204 | 6,8-disulfo-2-naphthylamine | 3-acetylamino-aniline | 4-(β-chloroethyl-sulfonyl-methyl)-benzoyl chloride | reddish-tinged yellow |

| | | -continued | | |
|---|---|---|---|---|
| 205 | 4-acetylamino-2,6-disulfo-aniline | 3-acetylamino-aniline | 3-(β-chloroethyl-sulfonyl-methyl)-benzoyl chloride | reddish-tinged yellow |
| 206 | 3-[4'-(β-chloroethylsulfonyl-methyl)-benzoylamino]-6-sulfo-aniline | 3-amino-phenylurea | 4-(β-chloroethyl-sulfonyl-methyl)-benzoyl chloride | reddish-tinged yellow |
| 207 | 3-[4'-(β-chloroethylsulfonyl-methyl)-benzoylamino]-6-sulfo-aniline | 3-acetylamino-aniline | 4-(β-chloroethylsulfonyl-methyl)-benzoyl chloride | reddish-tinged yellow |
| 208 | 3-[4'-(β-chloroethylsulfonyl-methyl)-benzoylamino]-6-sulfo-aniline | 2-methoxy-5-acetyl-amino-aniline | 4-(β-chloroethylsulfonyl-methyl)-benzoyl chloride | orange |
| 209 | sulfanilic acid | 1-amino-3,6-disulfo-8-naphthol | 3-[4'-(β-chloroethylsulfonyl-methyl)-benzoylamino]-6-sulfo-aniline | bluish-tinged black |
| 210 | 2,5-disulfoaniline | 1-amino-3,6-disulfo-8-naphthol | 3-[4'-(β-chloroethylsulfonyl-methyl)-benzoylamino]-6-sulfo-aniline | bluish-tinged black |
| 211 | 2,4-disulfoaniline | 1-amino-3,6-disulfo-8-naphthol | 3-[4'-(β-chloroethylsulfonyl-methyl)-benzoylamino]-6-sulfo-aniline | bluish-tinged black |
| 212 | othanilic acid | 1-amino-3,6-disulfo-8-naphthol | 3-[4'-(β-chloroethylsulfonyl-methyl)-benzoylamino]-6-sulfo-aniline | bluish-tinged black |
| 213 | 1-sulfo-2-naphthylamine | 1-amino-3,6-disulfo-8-naphthol | 3-[4'-(β-chloroethylsulfonyl-methyl)-benzoylamino]-6-sulfo-aniline | greenish-tinged black |
| 214 | 3,6-disulfo-2-naphthylamine | 1-amino-3,6-disulfo-8-naphthol | 3-[4'-(β-chloroethylsulfonyl-methyl)-benzoylamino]-6-sulfo-aniline | greenish-tinged black |
| 215 | 4,8-disulfo-2-naphthylamine | 1-amino-3,6-disulfo-8-naphthol | 3-[4'-(β-chloroethylsulfonyl-methyl)-benzoylamino]-6-sulfo-aniline | greenish-tinged black |
| 216 | 4-sulfo-2-naphthylamine | 1-amino-3,6-disulfo-8-naphthol | 3-[4'-(β-chloroethylsulfonyl-methyl)-benzoylamino]-6-sulfo-aniline | greenish-tinged black |
| 217 | orthanilic acid | 1-amino-3,6-disulfo-8-naphthol | 4-[4'-(β-chloroethylsulfonyl-methyl)-benzoylamino]-2-sulfo-aniline | greenish-tinged black |
| 218 | sulfanilic acid | 1-amino-3,6-disulfo-8-naphthol | 4-[4'-(β-chloroethylsulfonyl-methyl)-benzoylamino]-2-sulfo-aniline | greenish-tinged black |
| 219 | 2,4-disulfoaniline | 1-amino-3,6-disulfo-8-naphthol | 4-[4'-(β-chloroethylsulfonyl-methyl)-benzoylamino]-2-sulfo-aniline | greenish-tinged black |
| 220 | 2,5-disulfoaniline | 1-amino-3,6-disulfo-8-naphthol | 4-[4'-(β-chloroethylsulfonyl-methyl)-benzoylamino]-2-sulfo-aniline | greenish-tinged black |
| 221 | 1,5-disulfo-2-naphthylamine | 1-amino-3,6-disulfo-8-naphthol | 4-[4'-(β-chloroethylsulfonyl-methyl)-benzoylamino]-2-sulfo-aniline | greenish-tinged black |

| Example | 1st diazo component | Coupling component | 2nd diazo component | Color shade |
|---|---|---|---|---|
| | | Disazo compounds with: | | |
| 222 | 4,8-disulfo-2-naphthylamine | 1-amino-3,6-disulfo-8-naphthol | 4-[4'-(β-chloroethylsulfonyl-methyl)-benzoylamino]-2-sulfo-aniline | greenish-tinged black |
| 223 | 4-sulfo-2,5-dichloro-aniline | 1-amino-3,6-disulfo-8-naphthol | 4-[4'-(β-chloroethylsulfonyl-methyl)-benzoylamino]-2-sulfo-aniline | greenish-tinged black |
| 224 | orthanilic acid | 1-amino-3,6-disulfo-8-naphthol | 4-[3'-(β-chloroethylsulfonyl-methyl)-benzoylamino]-2-sulfo-aniline | greenish-tinged black |
| 225 | 2,5-disulfoaniline | 1-amino-3,6-disulfo-8-naphthol | 4-[3'-(β-chloroethylsulfonyl-methyl)-benzoylamino]-2-sulfo-aniline | greenish-tinged black |
| 226 | 1,5-disulfo-2-naphthylamine | 1-amino-3,6-disulfo-8-naphthol | 4-[3'-(β-chloroethylsulfonyl-methyl)-benzoylamino]-2-sulfo-aniline | greenish-tinged black |
| 227 | sulfanilic acid | 1-amino-3,6-disulfo-8-naphthol | 3-[3'-(β-chloroethylsulfonyl-methyl)-benzoylamino]-6-sulfo-aniline | bluish-tinged black |
| 228 | 2,4-disulfoaniline | 1-amino-3,6-disulfo-8-naphthol | 3-[3'-(β-chloroethylsulfonyl-methyl)-benzoylamino]-6-sulfo-aniline | bluish-tinged black |
| 229 | 1,5-disulfo-2-naphthylamine | 1-amino-3,6-disulfo-8-naphthol | 3-[3'-(β-chloroethylsulfonyl-methyl)-benzoylamino]-6-sulfo-aniline | greenish-tinged black |
| 230 | 2,5-disulfo-aniline | 1-amino-4,6-disulfo-8-naphthol | 3-[3'-(β-chloroethylsulfonyl-methyl)-benzoylamino]-6-sulfo-aniline | bluish-tinged black |
| 231 | 1,5-disulfo-2-naphthylamine | 1-amino-4,6-disulfo- | 3-[3'-(β-chloroethylsulfonyl- | black |

| | | | -continued | |
|---|---|---|---|---|
| | | 8-naphthol | methyl)-benzoylamino]-6-sulfo-aniline | |
| 232 | 1,5-disulfo-2-naphthylamine | 1-amino-4,6-disulfo-8-naphthol | 3-[4'-(β-chloroethylsulfonyl-methyl)-benzoylamino]-6-sulfo-aniline | black |
| 233 | 2,5-disulfoaniline | 1-amino-4,6-disulfo-8-naphthol | 3-[4'-(β-chloroethylsulfonyl-methyl)-benzoylamino]-6-sulfo-aniline | black |
| 234 | 2,5-disulfoaniline | 1-amino-4,6-disulfo-8-naphthol | 4-[4'-(β-chloroethylsulfonyl-methyl)-benzoylamino]-2-sulfo-aniline | black |
| 235 | 3-[4'-(β-chloroethylsulfonyl-methyl)-benzoylamino]-6-sulfo-aniline | 1-amino-3,6-disulfo-8-naphthol | 3-[4'-(β-chloroethylsulfonyl-methyl)-benzoylamino]-6-sulfo-aniline | black |
| 236 | 3-[4'-(β-chloroethylsulfonyl-methyl)-benzoylamino]-6-sulfo-aniline | 1-amino-4,6-disulfo-8-naphthol | 3-[4'-(β-chloroethylsulfonyl-methyl)-benzoylamino]-6-sulfo-aniline | bluish-tinged black |
| 237 | 3-[4'-(β-chloroethylsulfonyl-methyl)-benzoylamino]-6-sulfo-aniline | resorcinol | 3-[4'-(β-chloroethylsulfonyl-methyl)-benzoylamino]-6-sulfo-aniline | orange |
| 238 | 4-[4'-(β-chloroethylsulfonyl-methyl)-benzoylamino-2-sulfo-aniline | 1-amino-3,6-disulfo-8-naphthol | 4-[4'-(β-chloroethylsulfonyl-methyl)-benzoylamino]-2-sulfo-aniline | greenish-tinged black |
| 239 | 4-[4'-(β-chloroethylsulfonyl-methyl)-benzoylamino-2-sulfo-aniline | 1-amino-4,6-disulfo-8-naphthol | 4-[4'-(β-chloroethylsulfonyl-methyl)-benzoylamino]-2-sulfo-aniline | black |
| 240 | 4-[4'-(β-chloroethylsulfonyl-methyl)-benzoylamino]-2,6-disulfo-aniline | 1-amino-4,6-disulfo-8-naphthol | 4-[4'-(β-chloroethylsulfonyl-methyl)-benzoylamino]-2,6-disulfo-aniline | greenish-tinged black |
| 241 | 4-[4'-(β-chloroethylsulfonyl-methyl)-benzoylamino]-5-methyl-2-sulfo-aniline | 1-amino-3,6-disulfo-8-naphthol | 4-[4'-(β-chloroethylsulfonyl-methyl)-benzoylamino]-5-methyl-2-sulfoaniline | greenish-tinged black |
| 242 | 4-[3'-(β-chloroethylsulfonyl-methyl)-benzoylamino]-2-sulfo-aniline | 1-amino-3,6-disulfo-8-naphthol | 4-[3'-(β-chloroethylsulfonyl-methyl)-benzoylamino]-2-sulfo-aniline | greenish-tinged black |

EXAMPLE 243

The fiber-reactive coupling component 1-[4'-(β-chloroethylenesulfonyl-methyl)-benzoylamino]-3,6-disulfo-8-naphthol according to the invention is prepared from 31.9 parts of 1-amino-8-naphthol-3,6-disulfonic acid and 31 parts of 4-(β-chloroethylsulfonyl-methyl)-benzoyl chloride according to Example 7. In a separate batch, 17.2 parts of benzidine-2,2'-disulfonic acid is tetrazotized by the customary procedure. To prepare the disazo compound, the two reaction mixtures are combined and coupling is carried out at a pH value of 5–6. After the coupling batch has been evaporated, an electrolyte-containing dark powder comprising 51 parts of the alkali metal salt (for example the sodium salt) of the compound of the formula

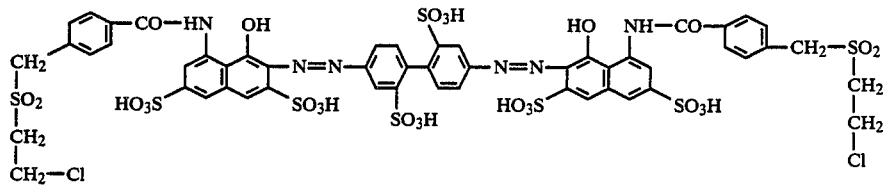

is obtained. This disazo compound is outstandingly suitable as a dyestuff for dyeing polyamide fiber materials and cellulose fiber materials, on which it gives deep, level violet dyeings and prints by the dyeing processes customary for fiber-reactive dyestuffs. The dyeings are distinguished by good wet fastness properties.

EXAMPLES 244 TO 252

The procedure followed for the preparation of a disazo compound of the general formula (1) according to the invention is analogous to the procedure described in Example 243, using one mole of a tetrazotizable diamino compound and 2 moles of a coupling component, in accordance with the data in the tubular Examples which follow. The resulting disazo compounds are particularly suitable for dyeing polyamide and cellulose fibers with good fastness properties and in the color shades given below by the dyeing processes customary in the art for fiber-reactive dyestuffs.

| Example | 2 moles of coupling component | 1 mole of tetrazo component | Color shade of the dyeing |
|---|---|---|---|
| 244 | 1-[4'-(β-chloro-ethylsulfonyl-methyl)-benzoyl-amino]-3,6-disulfo-8-naphthol | benzidine-3,3'-disulfonic acid | reddish-tinged blue |
| 245 | 1-[4'-(β-chloro-ethylsulfonyl-methyl)-benzoyl-amino]-3,6-disulfo-8-naphthol | o-tolidine | reddish-tinged blue |
| 246 | 1-[4'-(β-chloro-ethylsulfonyl-methyl)-benzoyl-amino]-3,6-disulfo-8-naphthol | o-dianisidine | reddish-tinged blue |
| 247 | 1-[4'-(β-chloro-ethylsulfonyl- | p-phenylenediamine | violet |

| Example | 2 moles of coupling component | 1 mole of tetrazo component | Color shade of the dyeing |
|---|---|---|---|
| | methyl)-benzoyl-amino]-3,6-disulfo-8-naphthol | | |
| 248 | 1-[4'-(β-chloro-ethylsulfonyl-methyl)-benzoyl-amino]-3,6-disulfo-8-naphthol | 1,3-diaminobenzene-4-sulfonic acid | violet |
| 249 | 1-[4'-(β-chloro-ethylsulfonyl-methyl)-benzoyl-amino]-3,6-disulfo-8-naphthol | 3,3'-diamino-diphenyl sulfone | violet |
| 250 | 1-[4'-(β-chloro-ethylsulfonyl-methyl)-benzoyl-amino]-3,6-disulfo-8-naphthol | 4,4'-diaminostilbene-2,2'-disulfonic acid | blue |
| 251 | 1-[4'-(β-chloro-ethylsulfonyl-methyl)-benzoyl-amino]-3,6-disulfo-8-naphthol | 2,6-diaminotoluene-4-sulfonic acid | violet |
| 252 | 1-[4'-(β-chloro-ethylsulfonyl-methyl)-benzoyl-amino]-3,6-disulfo-8-naphthol | 4,4'-diamino-diphenyl-amine-2-sulfonic acid | blue-black |

EXAMPLE 253

3-[4'-(β-chloroethylsulfonyl-methyl)-benzoylamino]-6-sulfo-aniline is prepared according to the statements in Example 4 and is then diazotized with sodium nitrite solution in the customary manner. 22.3 parts of an industrial mixture of 6- and 7-sulfo-1-naphthylamine are added to this diazonium salt solution and this coupling batch is stirred for some hours at a pH value of 1 to 3. The orange-red aminoazo compound thus formed is diazotized again, and a neutral aqueous solution of 30.1 parts of 1-phenylaminonaphthalene-8-sulfonic acid is then added, as the second coupling component; the coupling is carried out at a pH value of 2 to 4. When this second coupling reaction has ended, the reaction mixture is adjusted to a pH value of 4 to 5 and clarified. The disazo compound synthesized is isolated from the filtrate in the customary way, for example by spray-drying, evaporation or salting out. A black, electrolyte-containing powder which comprises the alkali metal salt of the compound of the formula

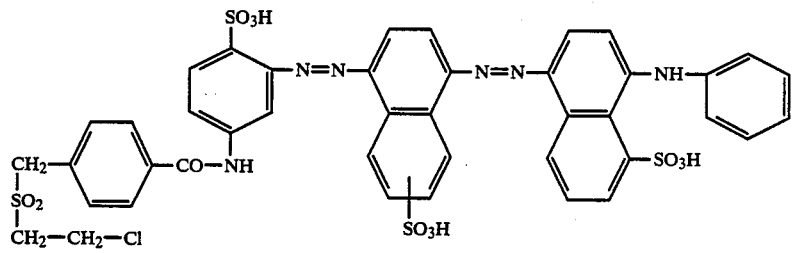

is obtained. This disazo compound is particularly suitable for dyeing polyamide fiber materials and cellulose fiber materials by the application and fixing processes customary for fiber-reactive dyestuffs. On these materials, it gives navy blue dyeings and prints with good wet fastness properties.

EXAMPLES 254 TO 260

The procedure followed for the preparation of a disazo compound of the general formula (1) according to the invention is analogous to that described in Example 253, and the particular diazo component, diazotizable coupling component and coupling component stated in the tabular Examples which follow are employed. These disazo compounds are also particularly suitable as fiber-reactive dyestuffs for dyeing polyamide and cellulose fibers, on which deep dyeings with good fastness properties are obtained in the shades indicated.

The copper complex disazo compound, according to the invention, of Example 260 is synthesized from the disazo compound, according to the invention, of Example 259 by dealkylating coppering by means of a copper-donating compound, for example copper-II chloride, using a procedure analogous to a customary known procedure of dealkylating coppering reactions.

| Example | Diazo component | Diazotizable coupling component | Coupling component | Color shade of the dyeing |
|---|---|---|---|---|
| 254 | 3-[4'-(β-chloroethylsulfonyl-methyl)-benzoylamino]-6-sulfo-aniline | 1-naphthylamine-7-sulfonic acid | N—ethyl-N—(3'-sulfo-benzyl)-aniline | violet |
| 255 | 3-[4'-(β-chloroethylsulfonyl-methyl)-benzoylamino]-6-sulfo-aniline | 1-naphthylamine-7-sulfonic acid | N,N—bis-(β-sulfato-ethyl)-aniline | violet |
| 256 | 3-[4'-(β-chloroethylsulfonyl-methyl)-benzoylamino]-6-sulfo-aniline | 1-naphthylamine-7-sulfonic acid | N—ethyl-N—(β-sulfato-ethyl)-3-chloro-aniline | violet |
| 257 | 4-[4'-(β-chloroethylsulfonyl-methyl)-benzoylamino]-2,6-disulfo-aniline | 1-naphthylamine | 1-phenylamino-naphthalene-8-sulfonic acid | navy blue |
| 258 | 4-[4'-(β-chloroethylsulfonyl-methyl)-benzoylamino]-2-sulfo-aniline | 1-aminonaphthalene-6,7-sulfonic acid | 1-phenylamino-naphthalene-8-sulfonic acid | navy blue |
| 259 | orthanilic acid | 2-methoxy-5-methyl-aniline | 1-[4'-(β-chloroethyl-sulfonyl-methyl)- | navy blue |

| Example | Diazo component | Diazotizable coupling component | Coupling component | Color shade of the dyeing |
|---|---|---|---|---|
| 260 | orthanilic acid | 2-methoxy-5-methyl-aniline | benzoylamino]-3,6-disulfo-8-naphthol 1-[4'-(β-chloroethyl-sulfonyl-methyl)-benzoylamino]-3,6-disulfo-8-naphthol with subsequent dealkylating coppering | navy blue |

EXAMPLE 261

32.6 parts of the compound 1-amino-4-[p-(N-methyl-N-acetylamino)-phenylamino]-anthraquinone-2-sulfonic acid are introduced into 330 parts of 8% strength oleum at 20°–30° C. in the course of 1 to 2 hours. The batch is subsequently stirred for 3 hours and is then poured into 3,000 parts of water, with stirring. The blue, sulfonated compound precipitates and is filtered off. The moist filter cake is then boiled under reflux in 250 parts of water and 40 parts of 33% strength hydrochloric acid for 4 hours. After the reaction mixture has cooled, it is rendered neutral with sodium hydroxide solution and the compound which has partly precipitated is redissolved by addition of water. The solution is now cooled to a temperature of 0°–10° C., 40 parts of crystalline sodium acetate are added, and 52 parts of 4-(β-chloroethylsulfonyl-methyl)-benzoyl chloride, either in pulverulent form or as a solution in a suitable solvent, such as, for example, chloroform, are then added in the course of 1 hour. The reaction mixture is subsequently stirred for 10 hours and the pH value is then adjusted to 5. The compound thus prepared is salted out with sodium chloride. A blue-black powder which contains sodium chloride and comprises the sodium salt of the compound of the formula shade and exhibit the good properties and fastnesses mentioned in Example 6. Dyeings and prints obtained on cotton and viscose staple with this dyestuff have the same shade and depth of color. Non-fixed portions of the dyestuff can easily be washed out.

EXAMPLES 262 TO 267

Further anthraquinone compounds, according to the invention, of the general formula (I)

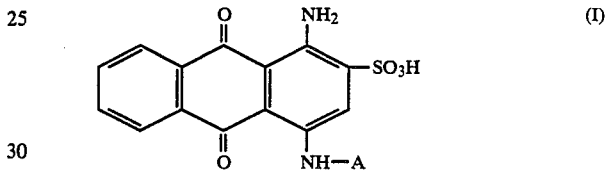

in which the substituent A on the 4-amino group has the meaning given in the tabular Examples, are prepared by a procedure analogous to that described in Example 261, using corresponding starting compounds, if appropriate with subsequent sulfonation, and with subsequent acylation with the fiber-reactive benzoyl chloride according to the invention. These compounds according to formula (1) likewise have very good dyestuff proper-

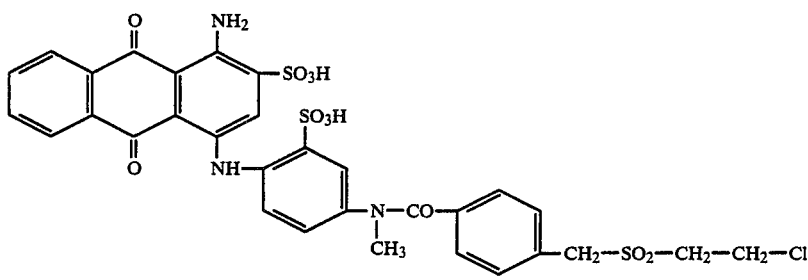

is obtained. This compound is particularly suitable as a dyestuff for dyeing polyamide and cellulose fiber materials by the dyeing and printing processes customary in the art. The dyeings and prints have a brilliant blue ties and give deep dyeings, especially on cellulose fiber materials, with the shades stated in the examples and with good fastness properties.

| Example | Substituent A | Color shade of the dyeing |
|---|---|---|
| 262 | (SO₃H-substituted phenyl)–NH–CO–(phenyl)–CH₂–SO₂–CH₂–CH₂–Cl | blue |

| Example | Substituent A | Color shade of the dyeing |
|---|---|---|
| 263 | ![structure with NH-CO, CH3, SO3H, CH2-SO2-CH2-CH2-Cl] | blue |
| 264 | ![structure with CH3, NH-CO, SO3H, CH2-SO2-CH2-CH2-Cl] | blue |
| 265 | ![structure with SO3H, NH-CO, CH2-SO2-CH2-CH2-Cl] | blue |
| 266 | ![structure with SO3H, CH=CH, SO3H, NH-CO, CH2-SO2-CH2-CH2-Cl] | green |
| 267 | ![structure with SO3H, NH, NH-CO, CH2-SO2-CH2-CH2-Cl] | olive |

EXAMPLE 268

59.6 parts of the formazan-copper complex compound of the formula

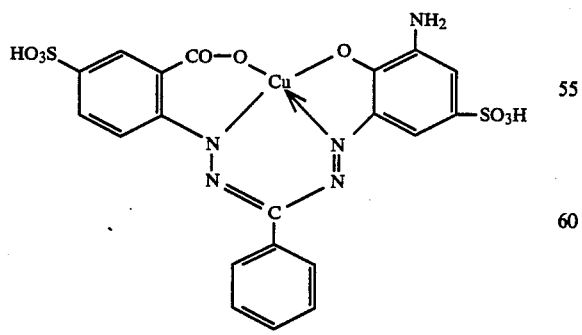

which is prepared in the customary manner, are dissolved in 400 parts of water under neutral conditions; 30 parts of crystalline sodium acetate are added, and 52 parts of 4-(β-chloroethylsulfonyl-methyl)-benzoyl chloride, in pulverulent form or as a solution, are added at a temperature of 0°–5° C., with good stirring. After the reaction mixture has been stirred for a further ten hours, the pH value is adjusted to 4 to 5 and the mixture is clarified by filtration. The formazan compound according to the invention is isolated from the filtrate in the customary way, that is to say by spray-drying or salting out. An electrolyte-containing black powder which comprises the alkali metal salt of the compound of the formula

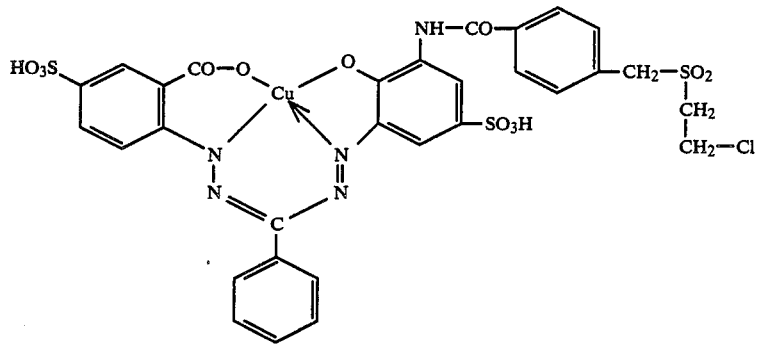

is obtained. This compound is particularly suitable as a dyestuff for dyeing and printing polyamide fiber materials and cellulose fiber materials by the dyeing methods customary in the art, and gives on these materials deep, blue dyeings and prints with good wet and light fastness properties.

EXAMPLES 269 TO 272

A formazan-copper complex compound containing an amino group (in which R' is hydrogen) indicated in the tabular Examples which follow is reacted with 4- or 3-($\beta$-chloroethylsulfonyl-methyl)-benzoyl chloride, as the fiber-reactive component, by a procedure analogous to that in Example 268, and the formazan-copper complex compound in which R' is the 4- or 3-($\beta$-chloroethylsulfonyl-methyl)-benzoyl group, which accords to formula (1), is thus obtained. These formazan-copper complex compounds according to the invention are likewise valuable dyestuffs which, especially on cellulose fiber materials, give dyeings which have the shades mentioned and good fastness properties.

| Example | Compound (1) according to the invention | Color shade of the dyeing |
|---|---|---|
| 269 | 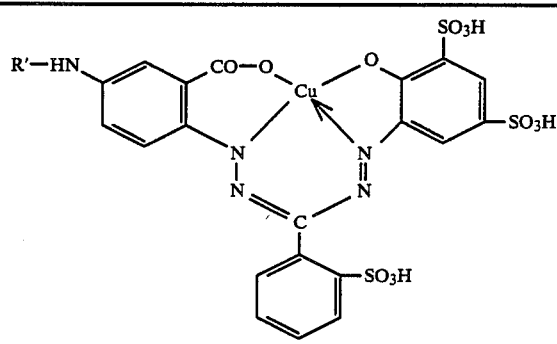 | blue |
| 270 | 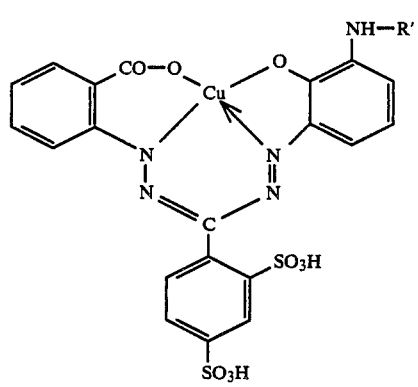 | blue |

| Example | Compound (1) according to the invention | Color shade of the dyeing |
|---|---|---|
| 271 | 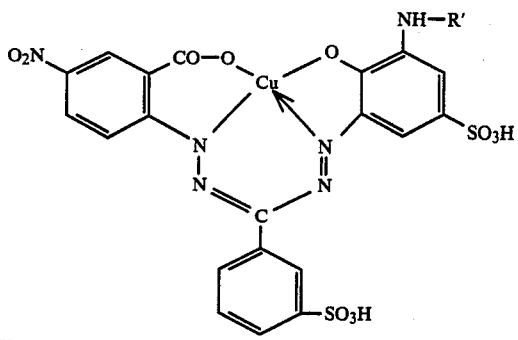 | greenish-tinged blue |

EXAMPLE 272

A sulfochloride is prepared from 100 parts of copper phthalocyanine and 1,000 parts of chlorosulfonic acid at 130°–140° C. in the customary way; this sulfochloride melt is then worked up in the customary manner, by a procedure in which the melt is stirred into water, the sulfochloride is separated off and stirred with ice-water to form a paste and this suspension is neutralized. This suspension is then combined with a neutral solution of 110 parts of benzidine-2,2'-disulfonic acid and 100 parts of pyridine and the mixture is stirred at a temperature below 10° C. for several hours. The reaction mixture is then rendered alkaline with sodium carbonate and is filtered and the compound prepared according to the invention is separated out of the filtrate by acidification and by salting out with sodium chloride or potassium chloride. The mixture is filtered and the filter cake is washed until free from benzidine. A neutral aqueous solution of the filter cake is then prepared and is reacted with a solution of about 90 parts of 4-(β-chloroethylsulfonyl-methyl)-benzoyl chloride in acetone by slow addition of this solution, until a sample of the reaction batch indicates that no further nitrite is being consumed; this reaction is carried out at a pH value of 5 to 7, which is adjusted with sodium bicarbonate or sodium acetate, and at a temperature of 0°–10° C.

The reaction solution is then clarified again and the resulting copper phthalocyanine compound according to the invention is salted out at a pH value of 4 to 5 by means of sodium chloride or isolated by spray-drying. An electrolyte-containing black powder which comprises the alkali metal salt (sodium or potassium salt) of the compound of the formula

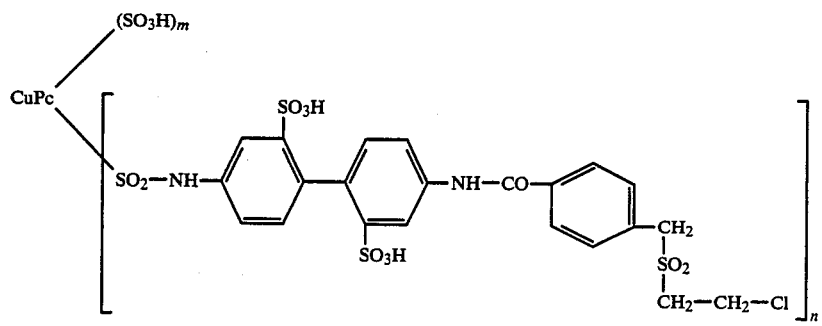

in which m has an average value of about 2.5 and n has an average value of about 1, is obtained. This compound has very good dyestuff properties and, when used by the application and fixing methods customary for fiber-reactive dyestuffs, dyes polyamide fiber materials and, in particular, cellulose fiber materials in turquoise blue shades with good wet fastness properties.

EXAMPLES 273 TO 276

To prepare a copper or nickel complex compound according to formula (1), the procedure customary for the synthesis of metal complex phthalocyanine compounds is followed, the corresponding phthalocyanine sulfochloride or phthalocyanine-sulfonic acid sulfochloride being reacted with a corresponding diamine and, if appropriate, with a further primary or secondary amino compound and the product subsequently being reacted with the benzoyl chloride of the general formula (3) according to the invention. Using corresponding starting compounds, the metal complex phthalocyanine compounds according to formula (1), as stated in the tabular Examples which follow, are obtained; these compounds have very good dyestuff properties and dye, in particular, cellulose fiber materials in the same manner giving dyeings with very good fastness properties and the shades indicated.

| Example | Compound of the formula (1) | Color shade of the dyeing |
|---|---|---|
| 273 | CuPc−(SO$_3$H)$_{1,6}$/SO$_2$NH$_2$/SO$_2$−NH−C$_6$H$_3$−NH−CO−C$_6$H$_4$−CH$_2$−SO$_2$−CH$_2$−CH$_2$−Cl | turquoise |
| 274 | CuPc−(SO$_3$H)$_{1,8}$/SO$_2$NH$_2$/SO$_2$−NH−C$_6$H$_2$(CH$_3$)(SO$_3$H)−NH−CO−C$_6$H$_4$−CH$_2$−SO$_2$−CH$_2$−CH$_2$−Cl | turquoise |
| 275 | CuPc−(SO$_3$H)$_{2,6}$/SO$_2$−NH−C$_6$H$_4$−NH−CO−C$_6$H$_4$−CH$_2$−SO$_2$−CH$_2$−CH$_2$−Cl | turquoise |
| 276 | NiPc−(SO$_3$H)$_{1,6}$/SO$_2$NH$_2$/SO$_2$−NH−C$_6$H$_2$(CH$_3$)(SO$_3$H)−NH−CO−C$_6$H$_4$−CH$_2$−SO$_2$−CH$_2$−CH$_2$−Cl | bluish-tinged green |

EXAMPLE 277

72.5 parts of the xanthene compound of the formula

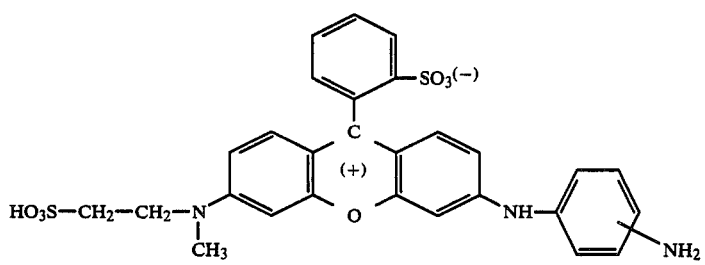

are dissolved in warm water to give a neutral solution; 30 parts of crystalline sodium acetate are added, followed by about 45 parts of 4-(β-chloroethylsulfonylmethyl)-benzoyl chloride, until free amino groups can no longer be detected. The reaction is carried out at a pH value between 5 to 7 and at a temperature between 0° and 10° C. The reaction solution is then clarified and the resulting xanthene compound according to the invention is isolated in the customary way. A dark, electrolyte-containing powder which comprises the compound of the formula (written in the form of the free acid)

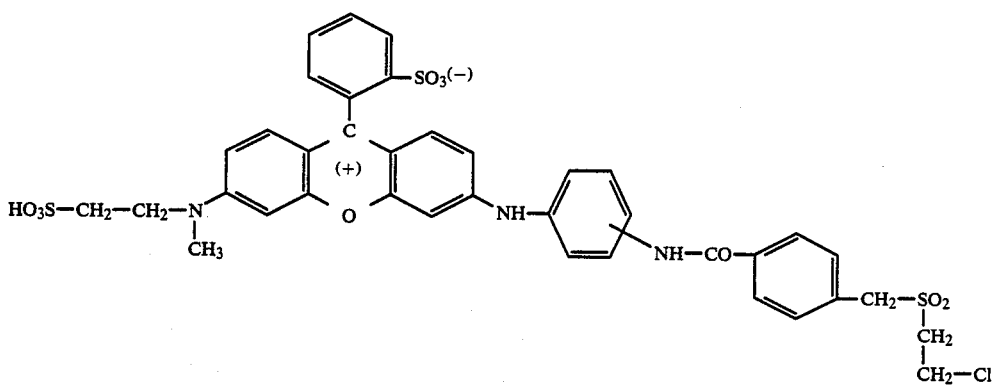

is obtained. This compound has good dyestuff properties and, when used in the dyeing and printing processes customary for fiber-reactive dyestuffs, dyes, in particular, cellulose fiber materials in deep, clear violet shades with good wet fastness properties.

We claim:

1. A compound of formula

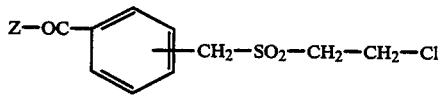

(3)

in which Z is halogen.

2. A compound according to claim 1 wherein Z is chlorine.

3. A compound according to claim 1, wherein the β-chloroethylsulfonylmethyl group is in the para-position.

4. A compound according to claim 1, wherein the β-chloroethylsulfonylmethyl group is in the meta-position.

5. A compound according to claim 2, wherein the β-chloroethylsulfonylmethyl group is in the para-position.

6. A compound according to claim 2, wherein the β-chloroethylsulfonylmethyl group is in the meta-position.

* * * * *